United States Patent
Kaneko et al.

(10) Patent No.: US 7,451,160 B2
(45) Date of Patent: Nov. 11, 2008

(54) METHOD AND APPARATUS FOR INTEGRATING MULTIMEDIA DATA, AND COMPUTER PRODUCT

(75) Inventors: Soutaro Kaneko, Kawasaki (JP); Kimihiko Kazui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 92 days.

(21) Appl. No.: 10/937,254

(22) Filed: Sep. 10, 2004

(65) Prior Publication Data

US 2005/0223033 A1 Oct. 6, 2005

(30) Foreign Application Priority Data

Apr. 2, 2004 (JP) .............................. 2004-110479

(51) Int. Cl.
G06F 7/00 (2006.01)
G06F 17/00 (2006.01)
G06K 9/36 (2006.01)
G06K 9/46 (2006.01)

(52) U.S. Cl. .................. 707/104.1; 707/100; 382/234

(58) Field of Classification Search ............... 707/10, 707/104.1, 100, 101, 102; 709/201, 219; 718/104, 105; 382/234

See application file for complete search history.

(56) References Cited

U.S. PATENT DOCUMENTS 6,965,569 B1 * 11/2005 Carolan et al. .............. 370/238

FOREIGN PATENT DOCUMENTS

JP 2003-185304 6/2003

OTHER PUBLICATIONS

Hejtmánek, L., and Holub, P. IBP Deployment Tests and Integration with DiDaS Project. CESNET Technical Report No. 20/2003 [online], Nov. 2003 [retrieved on Aug. 27, 2006]. Retrieved from the Internet:<URL: http://www.cesnet.cz/doc/techzpravy/2003/ibpdidas/ibpdidas.pdf>.*

Wadleigh, K., and Crawford, I. 11.7. Iterative Techniques. Software Optimization for High-Performance Computing [online]. Upper Saddle River, New Jersey: Prentice Hall PTR, 2000 [retrieved on Aug. 30, 2006]. Retrieved from the Internet:<URL: http://proquest.safaribooksonline.com/0130170089> Chapter 11.7.*

Antony Bolante. Premiere 6 for Macintosh and Windows: Visual QuickStart Guide [online]. Peachpit Press, 2001[retrieved on May 18, 2007]. Retrieved from the Internet:<URL: http://proquest.safaribooksonline.com/0201722070 > Chapter 18, section: "Frame Rate."*

Kevin L. Gong et al. Parallel MPEG-1 Video Encoding. 1991. Technical Report. UMI Order No. CSD-94-811., University of California at Berkeley.*

* cited by examiner

Primary Examiner—John Cottingham
Assistant Examiner—Jason L Alvesteffer
(74) Attorney, Agent, or Firm—Staas & Halsey LLP

(57) ABSTRACT

A calculating unit of an integration server calculates an optimal processing sharing ratio for image format conversion processing between the integration server and each of a plurality of video accumulation servers. A processing unit of the integration server and each of the video accumulation servers perform image format conversion processing in a distributed manner based on the processing sharing ratio. An integrating unit of the integration server integrates the multimedia data subjected to the conversion processing by each of the video accumulation servers and the multimedia data subjected to the conversion processing by the processing unit.

11 Claims, 21 Drawing Sheets

FIG.5

INTEGRATED VIDEO DELIVERY PORTAL PAGE

PLEASE SELECT POINTS OF CAMERAS, FOR WHICH VIDEOS ARE REQUESTED, AND TIME LENGTHS OF VIDEOS

- ☒ CAMERA POINT 1 — [ 10 ] (SECONDS)
- ☒ CAMERA POINT 2 — [ 10 ] (SECONDS)
- ☒ CAMERA POINT 3 — [ 10 ] (SECONDS)
- ☐ CAMERA POINT 4 — [    ] (SECONDS)

PLEASE SELECT START TIME OF VIDEO

- ☒ LATEST VIDEO
- ☐ TIME DESIGNATION [                    ]
  (YYYY - MM - DDThh:mm:ss  FORMAT )

FIG.6

```
<clip>
 <par>
  <seq>
   <video src="http://serv1.dmp.org/id1"
       clip-begin="2004-04-01T10:00:00"
       clip-end="2004-04-01T10:00:10" />
   <video src="http://serv2.dmp.org/id1"
       clip-begin="2004-04-01T10:00:10"
       clip-end="2004-04-01T10:00:20" />
   <video src="http://serv3.dmp.org/id1"
       clip-begin="2004-04-01T10:00:20"
       clip-end="2004-04-01T10:00:30" />
  </seq>
  <seq>
   <audio src="http://serv1.dmp.org/id1"
       clip-begin="2004-04-01T10:00:00"
       clip-end="2004-04-01T10:00:10"/>
   <audio src="http://serv2.dmp.org/id1"
       clip-begin="2004-04-01T10:00:10"
       clip-end="2004-04-01T10:00:20" />
   <audio src="http://serv3.dmp.org/id1"
       clip-begin="2004-04-01T10:00:20"
       clip-end="2004-04-0T10:00:30" />
  </seq>
 </par>
</clip>
```

FIG.7

```
<clip>
  <video src="http://serv1.dmp.org/id1"
        clip-begin="2004-04-01T10:00:00"
        clip-end="2004-04-01T10:00:10" />
  <audio src="http://serv1.dmp.org/id1"
        clip-begin="2004-04-01T10:00:00"
        clip-end="2004-04-01T10:00:10"/>
</clip>
```

FIG.8

```
<codectype>
  <video codec="mpeg-4 video" res="QCIF" fps="15" bps="64000"/>
  <audio codec="amr nb" bps="8000"/>
</codectype>
```

FIG.9

```
<getoriginalvideo length="1000" />
```

FIG.10

```
<integrateserverprofile>
  <coefficient video="0.1" integrate="0.01"/>
  <network bandwidth=" 100000000"/>
</integrateserverprofile>
```

```
<status>
  <search result="true"/>
  <videosrc bps="200000" fps="15"/>
  <coefficient demux="0.1" video="0.5" audio="0.3"/>
</status>
```

FIG.19

NUMBER OF INTEGRATION OBJECT ACCUMULATION SERVERS: m

INTEGRATION ORDER VIDEO ACCUMULATION SERVER NUMBER: $n(1 \leq n \leq m)$

BIT RATE FOR IMAGES BEFORE CONVERSION: $V_{bit}(n)$

BIT RATE FOR IMAGES AFTER CONVERSION : $V'_{bit}(n)$

BIT RATE FOR SOUNDS AFTER CONVERSION: $A'_{bit}(n)$

FRAME RATE FOR IMAGES BEFORE CONVERSION: $F_{rate}(n)$ demux COEFFICIENT: $C_{demux}(n)$ IMAGE CONVERSION PROCESSING COEFFICIENT: $C_{video}(n)$ SOUND CONVERSION PROCESSING COEFFICIENT: $C_{audio}(n)$ INTEGRATION PROCESSING COEFFICIENT: $C_{integrate}(n)$ TOTAL REQUESTED VIDEO LENGTH: $L_{all}(n)$ INTEGRATION SERVER PROCESSING VIDEO LENGTH: $L_I(n)$ IMAGE CONVERSION PROCESSING COEFFICIENT: $C_{videoI}$

EFFECTIVE NETWORK BAND: N

FIG.20

INTEGRATION SERVER TOTAL PROCESSING ACCUMULATED TIME: $T_I(n)$

VIDEO ACCUMULATION SERVER PROCESSING TIME: $T_S(n)$

INTEGRATION SERVER IMAGE CONVERSION PROCESSING TIME: $T_{IconvV}(n)$

INTEGRATION SERVER INTEGRATION PROCESSING ACCUMULATED TIME: $T_{Iintegrate}(n)$

VIDEO ACCUMULATION SERVER SOUND CONVERSION PROCESSING TIME: $T_{Saudio}(n)$

VIDEO ACCUMULATION SERVER PROCESSING IMAGE TRANSMISSION TIME: $T_{SsendV}(n)$

VIDEO ACCUMULATION SERVER IMAGE CONVERSION PROCESSING TIME: $T_{SconvV}(n)$ $$T_I(0) = 0, \quad T_I(n) = \mathrm{MAX}(T_S(n), T_{IconvV}(n), T_{Iintegrate}(n)) \quad \ldots(1)$$

$$T_S(n) = \mathrm{MAX}(T_{Saudio}(n) + T_{SsendV}(n), T_{SconvV}(n)) \quad \ldots(2)$$

$$T_{IconvV}(0) = 0, \quad T_{IconvV}(n) = T_{IconvV}(n-1) + L_I(n) \cdot C_{videoI} \quad \ldots(3)$$

$$T_{Iintegrate}(n) = \mathrm{MAX}\left( T_I(n-1), L_I(n) \cdot C_{demux}(n) + \frac{V_{bit}(n)}{F_{rate}(n) \cdot N} \right) + L_I(n) \cdot C_{Iintegrate}(n) \quad \ldots(4)$$

$$T_{Saudio}(n) = \mathrm{MAX}\left( L_{all}(n) \cdot C_{audio}(n), L_I(n) \cdot C_{demux}(n) + \frac{V_{bit}(n)}{F_{rate}(n) \cdot N} + \frac{L_{all}(n) \cdot A'_{bit}(n)}{N} \right) \quad \ldots(5)$$

$$T_{SsendV}(n) = \frac{(L_{all}(n) - L_I(n)) \cdot V'_{bit}(n)}{N} \quad \ldots(6)$$

$$T_{SconvV}(n) = L_I(n) \cdot C_{demux}(n) + (L_{all}(n) - L_I(n)) \cdot C_{video}(n) \quad \ldots(7)$$

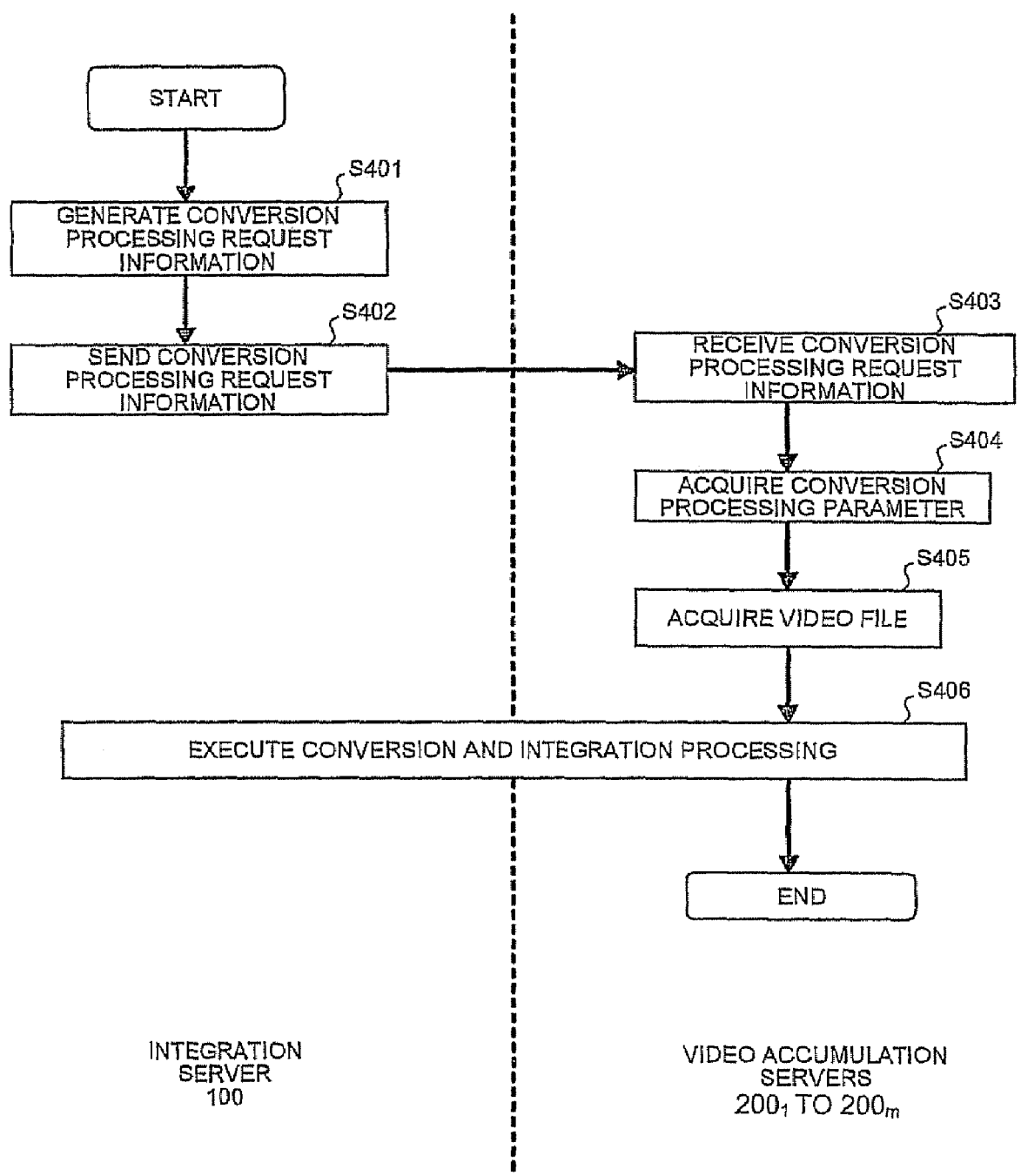

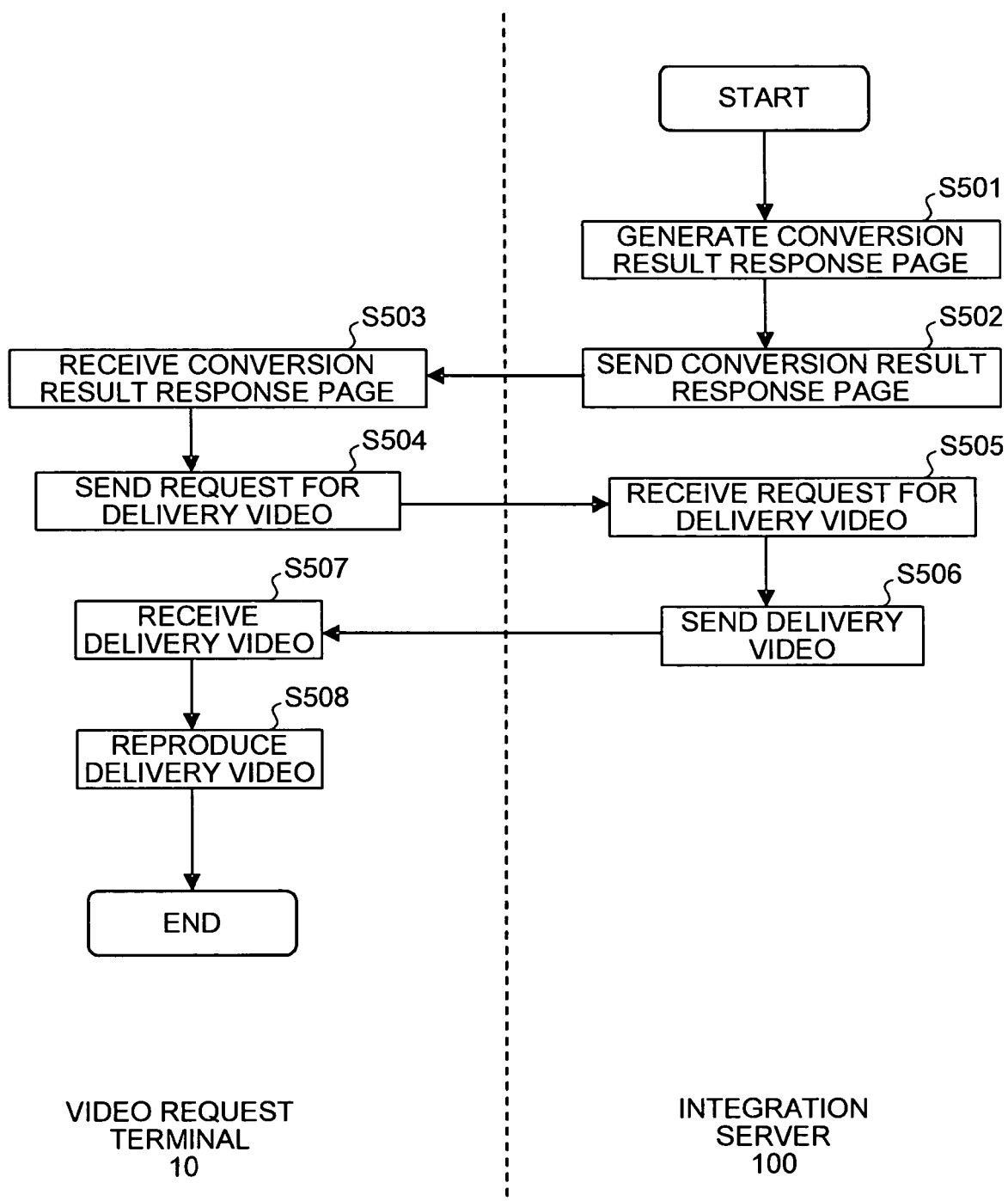

METHOD AND APPARATUS FOR INTEGRATING MULTIMEDIA DATA, AND COMPUTER PRODUCT

BACKGROUND OF THE INVENTION

1) Field of the Invention

The present invention relates to a technology for efficient integration of multimedia data.

2) Description of the Related Art

Recently, in accordance with the development in a network environment and a multimedia technique through the Internet, various systems have been realized. Among the systems, there is a video delivery system for delivering a video, which is a kind of multimedia data, to terminals of users.

Examples of the video delivery system include a remote video delivery system (a system that encodes a video photographed by an installed camera and delivers the video to viewer terminals through network transmission) and a mobile video delivery system (a system that delivers a video to portable terminals such as cellular phones).

It is conceivable that, in future, higher-order services are provided by combining these systems. More specifically, there is a system that accumulates videos at plural points, which are photographed by a large number of cameras arranged in a wide environment, in a video accumulation server arranged in each area and reconstitutes one video for portable terminals from the videos at the plural points to distribute the video to a portable terminal when delivery of the video is requested by the portable terminal. This system makes it possible to acquire videos in a wide area instantly regardless of time and place.

Such a system is promising from viewpoints of information transmission in the form of a video with an object of revitalization of a region, early preventive measures for disaster prevention, and the like. However, element techniques described below are required to realize this system.

First, when a video is delivered to portable terminals, it is necessary to convert accumulated videos managed by the video accumulation server into a data format with which the video can be referred to by the portable terminals. For example, compared with a general personal computer, a cellular phone has a smaller data size that can be treated as image data and has a different coding method. Thus, it is necessary to convert the coding method or the like to reproduce accumulated videos, which are stored in a high image quality, in the portable terminals.

In addition, to integrate videos accumulated in plural places under a wide environment to bring the videos into a deliverable state, it is necessary to provide a system that performs cooperative processing through network transmission between an integration server that creates a deliverable image and a video accumulation server that manages an object video.

More specifically, it is necessary to provide a system in which an integration server requests different plural video accumulation servers, which manage object images, to transmit a part of accumulated videos, and the plural video accumulation servers transmit videos required for integration through a network in response to the request.

In addition, to improve processing efficiency of the system, it is necessary to make video transmission over the network efficient. When a video required for integration is transmitted over the network, rather than transmitting the entire video to the integration server and extracting an object time slot in the integration server, a time slot is extracted in the video accumulation server in advance before the network transmission and only a part of the videos corresponding to the time slot is transmitted (see, for example, Japanese Patent Application Laid-Open Publication No. 2003-185304).

However, in the conventional method, there is a problem in that, since it takes time to regenerate a video for portable terminals, a significant delay occurs from the time when delivery of the video is requested until the time when the delivery is actually started. Thus, it is necessary to reduce a processing time until the video for portable terminals is regenerated. For this purpose, it is necessary to use calculation resources of respective servers constituting the system efficiently. In other words, it is necessary to perform appropriate distribution processing in the respective servers constituting the system.

Here, processing necessary until the video for portable terminals is generated includes slicing of videos, decoding, reduction in resolution, re-encoding, and integration. In the slicing of the videos, parts of the videos are sliced by a unit of time slot, for example, ten seconds out of a file consisting of videos for several hours. In the decoding, encoded accumulated videos are decoded. In the reduction in resolution, arithmetic processing is applied to the decoded videos to reduce a resolution to meet criteria in portable terminals to which the videos are delivered. In the re-encoding, the videos subjected to the reduction in resolution are re-encoded to be videos of a format corresponding to the terminals to which the videos are delivered. Finally, the videos in the plural points are integrated as one video by the integration to change the format to a file format with which the terminals, to which the video are delivered, can perform reproduction processing.

This processing is characterized in that an amount of calculation is larger in the decoding, the reduction in resolution, and the re-encoding compared with the slicing of videos and the integration. In addition, when the videos from the plural points are integrated, there are plural video accumulation servers to be objects of integration. Considering these respective kinds of processing as processing units, the processing up to the re-encoding is performed the number of times equivalent to the number of the video accumulation servers.

In other words, in the conventional method, the kinds of processing requiring a large amount of calculation, namely, the decoding, the reduction in resolution, and the re-encoding are performed on the integration server side with respect to all the accumulated videos at plural points to be objects of integration. Thus, that part of the processing is a bottleneck for the entire processing.

On the other hand, processing performed in the respective video accumulation servers is only the slicing of videos. Thus, after slicing the videos, the video accumulation servers performs no processing while the integration server performs the processing requiring a large amount of calculation. This means that calculation resources of the video accumulation servers after slicing the videos are not used well.

Thus, a method is conceivable in which, before transmitting a time slot of an object video to the integration server, the processing including the slicing, the decoding, the reduction in resolution, and the re-encoding of videos is performed in the video accumulation servers in advance, and only the integration processing is performed in the integration server. In this way, the decoding, the reduction in resolution, and the re-encoding, which are the kinds of processing requiring a large amount of calculation, are performed in the respective video accumulation servers. As a result, since the kinds of processing performed only in the integration server are distributed, the calculation resources can be used efficiently and a reduction in a processing time to some extent can be expected compared with the conventional method.

However, the method has a problem in that a total processing time depends on a processing time of a slowest video accumulation server, and an increase in delay due to the video accumulation servers, which require a longer processing time compared with other points, cannot be controlled. On the other hand, since processing that should be performed in the integration server is only the integration processing, a problem also occurs in that, contrary to the conventional method, calculation resources of the integration server is not used efficiently.

SUMMARY OF THE INVENTION

A multimedia-data integration apparatus according to one aspect of the present invention includes a calculating unit that calculates a processing sharing ratio with which each of a plurality of multimedia-data accumulation apparatuses and the multimedia-data integration apparatus share a conversion processing for converting a data format of multimedia data from among first multimedia data accumulated in the multimedia-data accumulation apparatuses into a different data format; a sending unit that sends the processing sharing ratio to each of the multimedia-data accumulation apparatuses; a receiving unit that receives second multimedia data that is partially subjected to conversion processing by each of the multimedia-data accumulation apparatuses based on the processing sharing ratio; a processing unit that applies the conversion processing for a data format of the second multimedia data that not subjected to the conversion processing from among the second multimedia data received by the receiving unit; and an integrating unit that integrates the second multimedia data that is subjected to the conversion processing by each of the multimedia-data accumulation apparatuses and the second multimedia data that is subjected to the conversion processing by the conversion processing unit, from among the second multimedia data received by the receiving unit, to create the integrated multimedia data.

A multimedia-data integration method according to another aspect of the present invention includes calculating unit a processing sharing ratio with which each of a plurality of multimedia-data accumulation apparatuses and the multimedia-data integration apparatus share a conversion processing for converting a data format of multimedia data from among first multimedia data accumulated in the multimedia-data accumulation apparatuses into a different data format; sending the processing sharing ratio to each of the multimedia-data accumulation apparatuses; receiving second multimedia data that is partially subjected to conversion processing by each of the multimedia-data accumulation apparatuses based on the processing sharing ratio; applying the conversion processing for a data format of the second multimedia data that not subjected to the conversion processing from among the second multimedia data received by the receiving unit; and integrating the second multimedia data that is subjected to the conversion processing by each of the multimedia-data accumulation apparatuses and the second multimedia data that is subjected to the conversion processing by the conversion processing unit, from among the second multimedia data received by the receiving unit, to create the integrated multimedia data.

A computer-readable recording medium according to still another aspect of the present invention stores a computer program for realizing the multimedia-data integration method on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a diagram of an example of a portal page that is generated by a Web interface generation unit;

FIG. 6 is a diagram of an example of a video integration format;

FIG. 7 is a diagram of an example of a requested video time format;

FIG. 8 is a diagram of an example of a video format designation format;

FIG. 9 is a diagram of an example of a processing sharing ratio notification format;

FIG. 10 is a diagram of an example of an integration server processing parameter format;

FIG. 19 is a diagram of a list of processing sharing ratio calculation parameters;

FIG. 20 is a diagram of formulas for processing sharing ratio calculation;

FIG. 21 is a flowchart of a processing procedure of conversion and integration processing;

FIG. 22 is a flowchart of a processing procedure of processing for notifying a result of processing:

DETAILED DESCRIPTIONS

Exemplary embodiments of a method and an apparatus for integrating multimedia data, and a computer product according to the invention will be described in detail with reference to the accompanying drawings. Note that, in this embodiment, it is assumed that a "video" includes voices, and a video not including voices is described as an "image".

Figure 1:
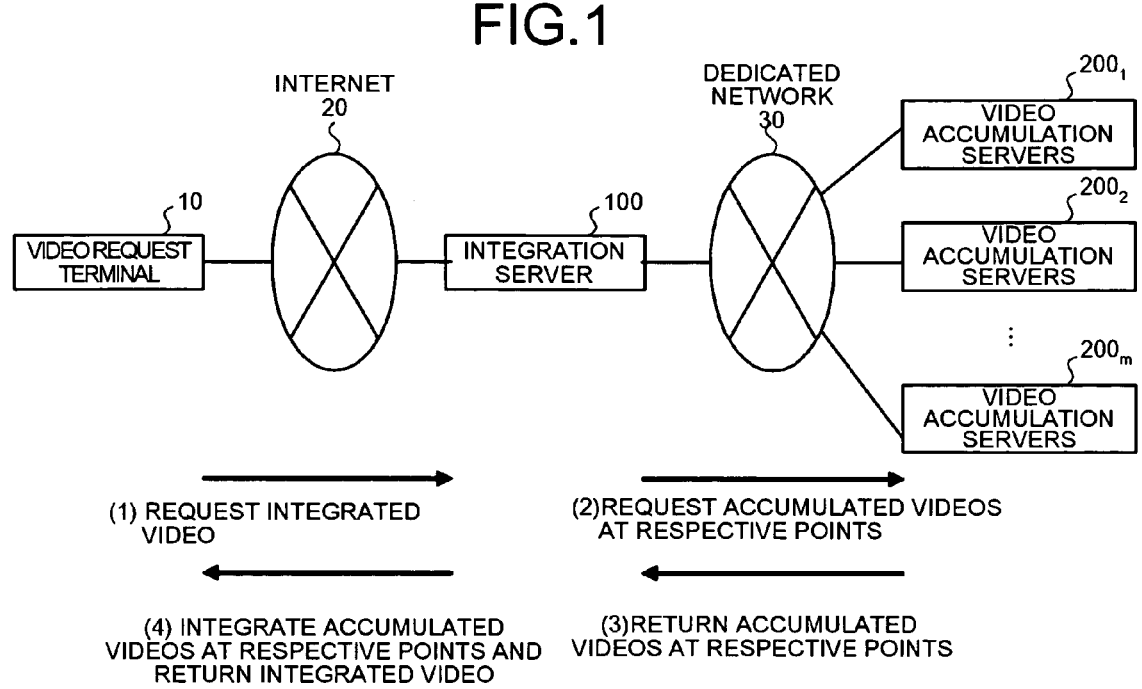
FIG. 1 is a diagram of a system configuration of an integrated video delivery system according to an embodiment of the invention.

FIG. 1 is a diagram of the system configuration of the integrated video delivery system according to an embodiment of the present invention. The integrated video delivery system is a distributed multimedia processing system and includes an integration server 100 and one or more video accumulation servers $200_1$ to $200_m$. It is possible to use the system from a video request terminal 10.

The video request terminal 10 and the integration server 100 are connected to the Internet 20. The integration server 100 and the video accumulation servers $200_1$ to $200_m$ are connected to a dedicated network 30. In addition, both the video accumulation servers $200_1$ to $200_m$ and the integration server 100 are servers having memories and hard disks and capable of executing programs and are capable of sending and receiving information through the dedicated network 30.

When the integration server 100 receives a video request from the video request terminal 10, the integrated video delivery system requests a part of videos accumulated in the respective video accumulation servers video accumulation servers $200_1$ to $200_m$ based on contents of the video request. Then, the integrated video delivery system combines videos obtained as a result of the video request to generate one temporally continuous video, notifies the video request terminal 10 of the generation of the video, and delivers the video to the video request terminal 10.

Note that, although only one video request terminal 10 is described here for convenience of explanation, the integrated video delivery system can be used from a large number of video request terminals 10. As the video request terminal 10, various information terminals including an information processing function such as a personal computer, a cellular phone, a PDA, and a vehicle-mounted communication apparatus can be used.

Figure 2:
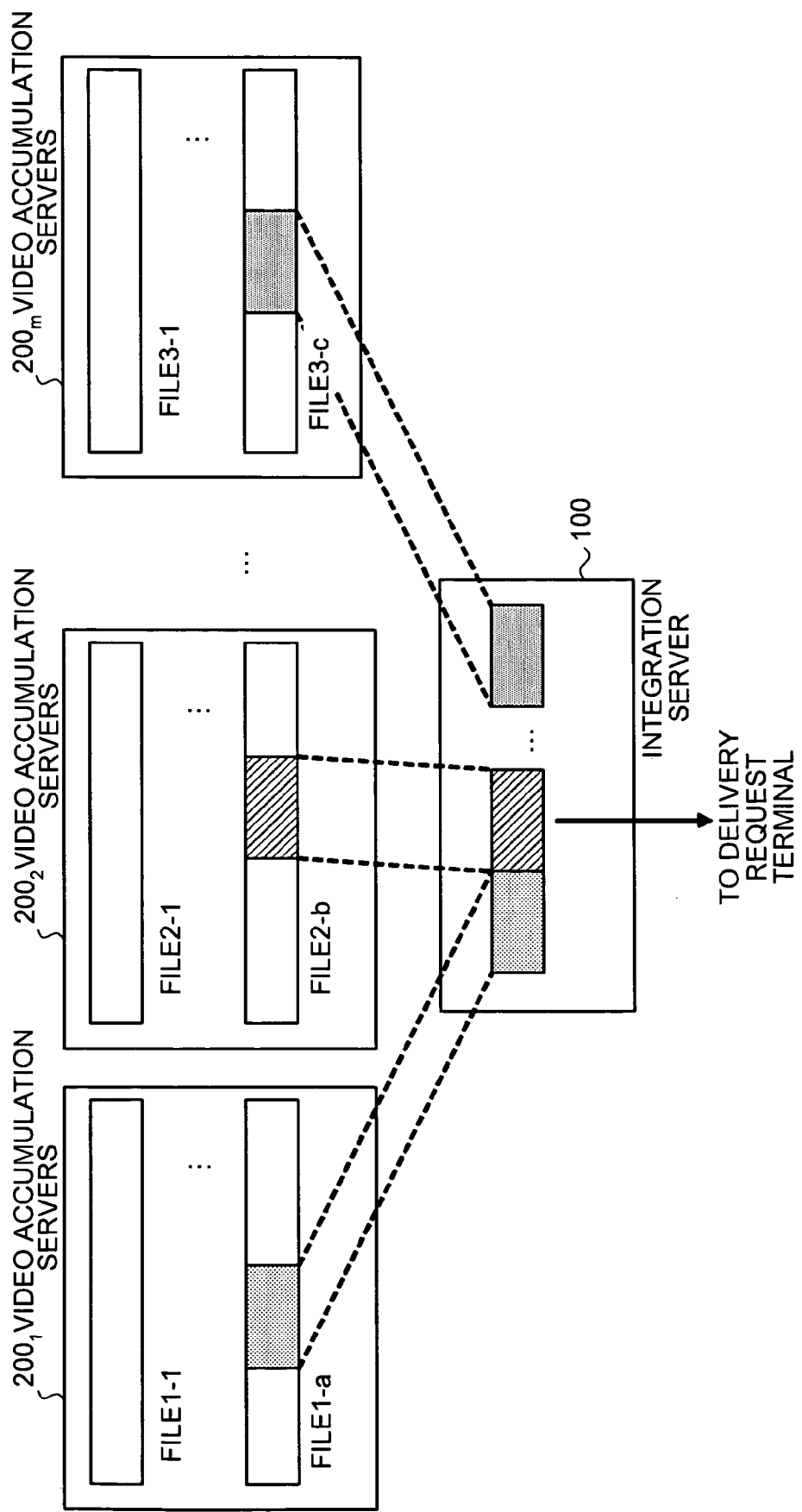
FIG. 2 is an explanatory diagram for explaining integration of accumulated videos.

FIG. 2 is an explanatory diagram for explaining integration of accumulated videos. The video accumulation servers $200_1$ to $200_m$ store videos including include time information, which is recorded using monitor cameras or the like, in hard disks as encoded video files.

In these video files, recorded videos for several minutes to several hours form one file. When a video of a camera at certain time is requested, a video file is specified uniquely based on recording start time at the top of files and time information of the requested video, whereby the requested video can be acquired partially from the video file.

The integration server 100 integrates videos from the respective video accumulation servers $200_1$ to $200_m$, which are acquired partially, as one temporarily continuous video according to an order. For example, when the integration server 100 receives videos for ten seconds from three video accumulation servers, respectively, a part of 0 to 10 seconds of the integrated video is the video from the video accumulation server $200_1$, a part of 10 to 20 seconds thereof is the video from the video integration server $200_2$, and a part of 20 to 30 seconds thereof is the video from the video accumulation server $200_3$.

When the integration server 100 integrates videos and prepares a video in a state in which the video is deliverable to the delivery request terminal 10, it is necessary to convert images and voices constituting the video into a format reproducible by the delivery request.

Figure 3:
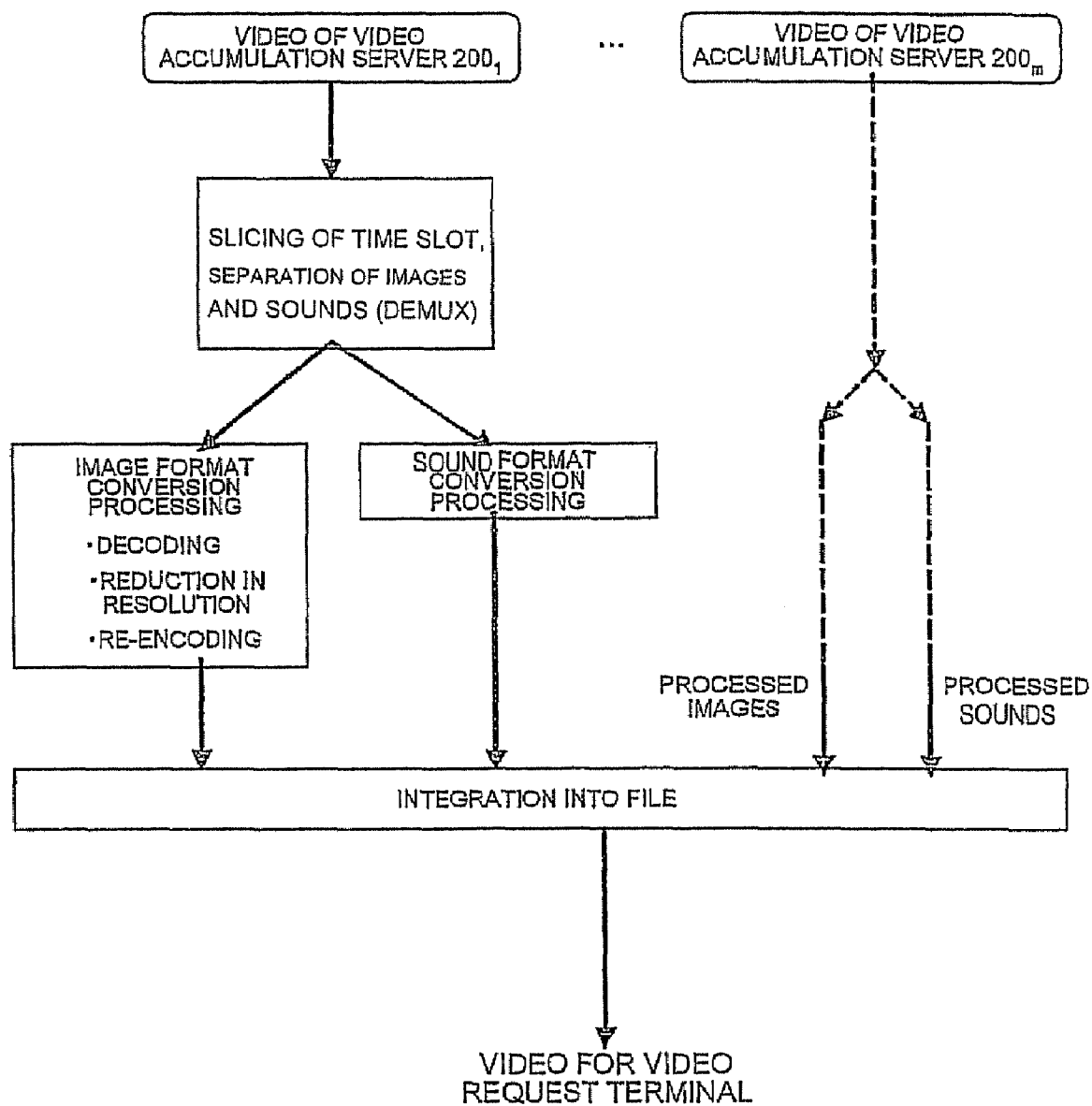
FIG. 3 is an explanatory diagram for explaining conversion and integration processing for converting accumulated videos into an integrated video.

Information such as a coding method supported by the delivery request terminal 10, an amount of information (bit rate), and image resolution is necessary to execute the conversion. In addition to the encoding of image and voices, it is necessary to convert a file format for treating information on the encoding. Here, FIG. 3 shows conversion and integration processing necessary for applying conversion processing to plural accumulated videos to integrate the videos and regenerate the videos as one video.

As shown in the figure, in this conversion and integration processing, the integration server 100 slices a time slot of a video requested by the delivery request terminal 10 from the video accumulation servers $200_1$ to $200_m$ to separate images and voices (demux).

Then, the integration server 100 applies image format conversion processing such as decoding, reduction in resolution, and re-encoding to the images and applies voice format conversion processing to the voices. Finally, the integration server 100 integrates the processed images and the processed voices, which have been subjected to the conversion processing, into a file of videos and generate a video for the video request terminal.

Figure 4:
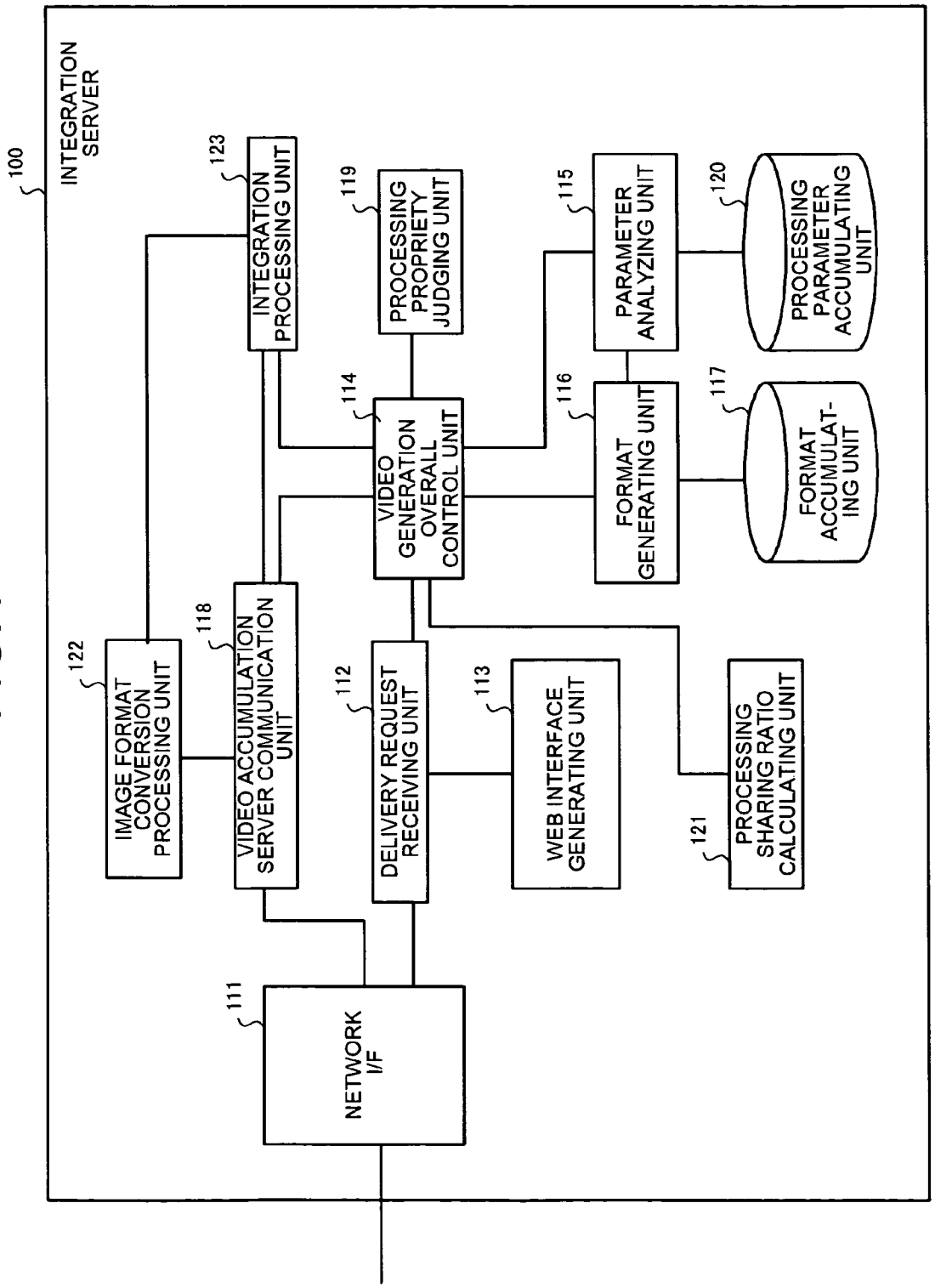
FIG. 4 is a functional diagram of a structure of an integration server according to the embodiment.

FIG. 4 is a functional diagram of the structure of the integration server 100 according to the embodiment. The integration server 100 includes a network I/F 111, a delivery request receiving unit 112, a Web interface generating unit 113, a video generation overall control unit 114, a parameter analyzing unit 115, a format generating unit 116, a format accumulating unit 117, a video accumulation server communication unit 118, a processing propriety judging unit 119, a processing parameter accumulating unit 120, a processing sharing ratio calculating unit 121, an image format conversion processing unit 122, and an integration processing unit 123.

The network I/F 111 is a processing unit that communicates with the delivery request terminal 10 via the Internet 20. The network I/F 111 receives a video delivery request from the delivery request terminal 10 and sends an integrated image to the delivery request terminal 10. The network I/F 111 also communicates with the video accumulation servers $200_1$ to $200_m$ via the dedicated network 30 and receives video data and the like from the video accumulation servers $200_1$ to $200_m$.

The delivery request receiving unit 112 is a processing unit that receives a video delivery request from the delivery request terminal 10 via the network I/F 111. When a video delivery request is received, the delivery request receiving unit 112 sends a portal page for designating a video to the delivery request terminal 10. In addition, the delivery request receiving unit 112 sends an integrated image generated by the integration server 100 to the delivery request terminal 10.

The Web interface generating unit 113 is a processing unit that generates a portal page to be sent to the delivery request terminal 10 by the delivery request receiving unit 112. FIG. 5 is a diagram of an example of the portal page generated by the Web interface generating unit 113.

In this portal page interface, a user can select videos in four places at the maximum designating time lengths. The user can also acquire the videos designating time when the videos were recorded. In this example, the user requests the integration server 100 to acquire latest information, that is, videos in three places for ten seconds, respectively, among recorded videos.

The video generation overall control unit 114 is a processing unit that performs overall control for the integration server 100. More specifically, for example, the video generation overall control unit 114 shifts control among functional units and delivers data among functional units and storing units.

The parameter analyzing unit 115 is a processing unit that analyzes request parameters concerning the videos to be acquired that is designated by the user using the portal page interface. The parameter analyzing unit 115 passes a result of the analysis to the format generating unit 116.

The format generating unit 116 is a processing unit that generates a video integration format, which designates a format of an integrated video, and a requested video time format, which is used when the integration server 100 requests the video accumulation servers 200$_1$ to 200$_m$ to send videos, based on the request parameters analyzed by the parameter analyzing unit 115.

In addition, after a processing sharing ratio between the integration server 100 and the video accumulation servers 200$_1$ to 200$_m$ is calculated, when the integration server 100 requests the video accumulation servers 200$_1$ to 200$_m$ to perform conversion processing, the format generating unit 116 generates conversion processing request information including a processing sharing ratio notification format that is used for notifying the processing sharing ratio.

When the format generating unit 116 generates a format, the format generating unit 116 acquires a model of the format from the format accumulating unit 117. In addition, the format generating unit 116 acquires a video format designation format, which designates a coding method for videos and the like requested by the delivery request terminal 10, from the format accumulating unit 117.

The format accumulating unit 117 is a storing unit that stores models of a video integration format, a requested video time format, and a processing sharing ratio notification format as well as a video format designation format. An XML format is used for all of these data formats.

FIG. 6 is a diagram of an example of the video integration format. The video integration format represents contents of a video to be generated finally. A clip element represents a top of the format. A par element means "parallel" and indicates that it is necessary to reconstitute a video such that respective elements at the top inside the par element are reproduced simultaneously. In addition, the video is reconstituted such that two seq elements following the par element are reproduced simultaneously.

The seq element means "sequential" and indicates that a video is reconstituted such that respective elements at the top inside the seq element are reproduced sequentially in an order of description. In FIG. 6, there is the seq element including three video elements, which indicates that three contents to be reproduced of the video elements are reproduced sequentially in an order of description. This holds true for the seq elements including three audio elements.

The video elements and the audio elements represent images and voices, which should be acquired, respectively. In these elements, a value of an src element is written in a URL and represents a position of a video accumulation server and a hierarchy for receiving an access to accumulated videos in the video accumulation server. Values of clip-begin and clip-end attributes indicate start time and end time of a requested video in a recorded video, which is held in the video accumulation server, according to time representation.

The representation in the first video element in FIG. 6 indicates that a recorded video from 10:00:00 in the morning on Apr. 1, 2004 to 10:00:10 in the morning on the same day is requested with respect to a video for which access is received in an "idl" hierarchy of a server "serv1.dmp.org". From these explanations, it is seen that, in the example of FIG. 6, it is attempted to acquire videos of cameras in three places for ten seconds, respectively, and reproduce the videos sequentially to obtain a video of 30 seconds and reconstitute a video reproducing images and voices of the video in synchronization with each other.

FIG. 7 is a diagram of an example of the requested video time format. The requested video time format is a partial element of the video integration format and represents information on videos and voices that are requested to be acquired from the respective video accumulation server. Contents of the elements and attributes are the same as those in the video integration format shown in FIG. 6.

FIG. 8 is a diagram of an example of the video format designation format. The video format designation format represents information such as a coding method for videos requested by the delivery request terminal 10. A codectype element represents a top of the format. A video element indicates an image format requested by the delivery request terminal 10.

A value of a codec attribute in the video element indicates a coding method for an image. The value of the res attribute indicates resolution. QCIF indicates resolution of 176×144. A value of an fps attribute indicates a frame rate of an image. A value of a bps attribute indicates a bit rate (amount of information) of an image.

An audio element indicates a voice system requested by the delivery request terminal 10. A value of a codec attribute in the audio element indicates a coding method for voices, and "amr nb" is designation of a voice codec Adaptive Multi-Rate Narrow Band (AMR-NB) that is used by the third-generation mobile communication (3G) and defined by $3^{rd}$ Generation Partnership Project (3GPP) that is a standardization organization. A value of a bps attribute indicates a bit rate of voices.

FIG. 9 is a diagram of an example of the processing sharing ratio notification format. A value of a length attribute in a getoriginalvideo element is a description of a video length, which is received by the integration server 100 in a form of an unprocessed image, by a unit of millimeter second.

The conversion processing request information also includes the requested video time format and the video format designation format other than the processing sharing ratio notification format. In addition, it is necessary to establish connection, which is required for transmitting image/voice data through a network from the video accumulation servers 200$_1$ to 200$_m$ side, separately from network connection for conversion request. Thus, the conversion processing request information also includes information on a necessary port number and the like.

The video accumulation server communication unit 118 is a processing unit that communicates with the video accumulation servers 200$_1$ to 200$_m$. The video accumulation server communication unit 118 sends the requested video time format, the video format designation format, and the like to the video accumulation servers 200$_1$ to 200$_m$ and receives video data and the like from the video accumulation servers 200$_1$ to 200$_m$. The video accumulation server communication unit 118 is a thread to be generated by the video generation overall control unit 114.

The processing propriety judging unit 119 is a processing unit that judges whether a video requested by the delivery request terminal 10 can be generated. For example, when a video at time requested by the delivery request terminal 10 cannot be acquired, the processing propriety judging unit 119 notifies the delivery request terminal 10 to that effect in a form of an HTML page.

The processing parameter accumulation unit 120 is a storing unit that stores an integration server processing parameter format representing a processing capability of the integration server 100. The integration server processing parameter format is information that the integration server 100 holds to calculate a processing sharing ratio.

FIG. 10 is a diagram of an example of the integration server processing parameter format. An integrate server profile element represents a top of the format. A coefficient element represents a capability of processing for accumulated videos in the integration server 100, and a network element represents information on the dedicated network 30 between the integration server 100 and the video accumulation servers $200_1$ to $200_m$. Note that values of the respective attributes in the respective elements will be explained according to circumstances when calculation of a processing sharing ratio will be explained later.

The processing sharing ratio calculating unit 121 is a processing unit that calculates a processing sharing ratio of processing shared by the integration server 100 and the video accumulation servers $200_1$ to $200_m$. The processing sharing ratio calculating unit 121 calculates an appropriate processing sharing ratio of image format conversion processing between the integration server 100 and the video accumulation servers $200_1$ to $200_m$, whereby processing speed for the image format conversion processing can be increased and processing speed for the entire conversion processing can be increased. Note that, in this embodiment, it is assumed that the conversion processing for a voice format is performed only by the video accumulation servers $200_1$ to $200_m$. Details of the calculation of a processing sharing ratio will be described later.

The image format conversion processing unit 122 is a processing unit that performs image format conversion processing for an unconverted image, which is sent from the video accumulation servers $200_1$ to $200_m$, based on the sharing ratio calculated by the processing sharing ratio calculating unit 121.

The integration processing unit 123 is a processing unit that integrates images subjected to conversion processing and voices subjected to conversion processing, which are received by the video accumulation server communication unit 118, and images, for which an image format is converted by the image format conversion processing unit 122, to generate an integrated video.

Next, a structure of the video accumulation servers $200_1$ to $200_m$ according this embodiment will be explained. Since all the video accumulation servers $200_1$ to $200_m$ have the same structure, the structure will be explained with the video accumulation server video accumulation servers $200_1$ as an example.

Figure 11:
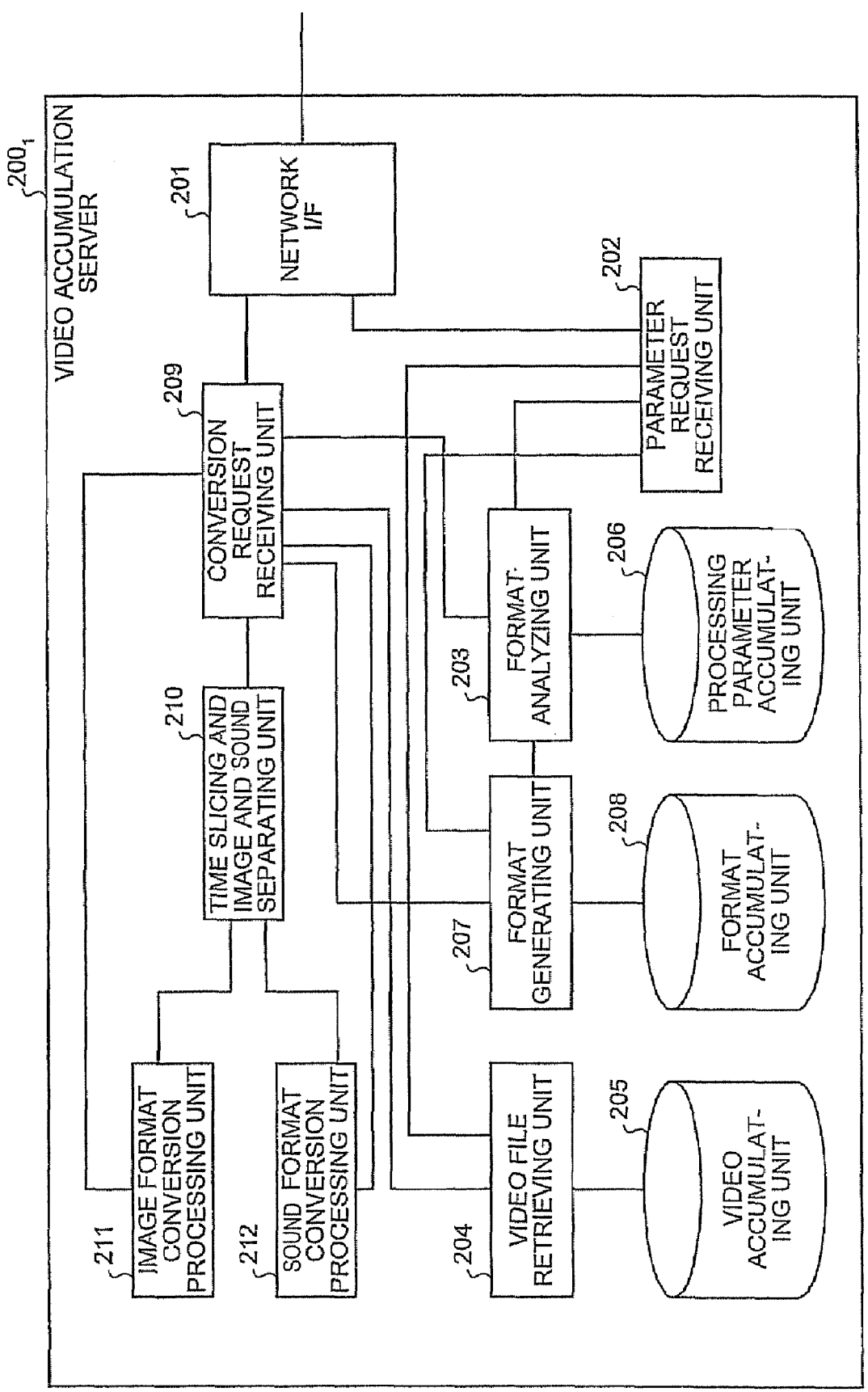
FIG. 11 is a functional diagram of a structure of a video accumulation server according to the embodiment.

FIG. 11 is a functional diagram of the structure of video accumulation server $200_1$ according to the embodiment. The video accumulation server $200_1$ includes a network I/F 201, a parameter request receiving unit 202, a format analyzing unit 203, a video file retrieving unit 204, a video accumulating unit 205, a processing parameter accumulating unit 206, a format generating unit 207, a format accumulating unit 208, a conversion request receiving unit 209, a time slicing and image and voice separating unit 210, an image format conversion processing unit 211, and a voice format conversion processing unit 212.

The network I/F 201 is a processing unit that communicates with the integration server 100 via the dedicated network 30. The network I/F 201 receives a video transmission request and the like from the integration server 100 and sends video data and the like to the integration server 100.

The parameter request receiving unit 202 is a processing unit that receives a requested video time format and a video format designation format, which are sent from the integration server 100, via the network I/F 201 and passes the formats to the format analyzing unit 203.

The format analyzing unit 203 is a processing unit that receives the requested video time format and the video format designation format from the parameter request receiving unit 202 and analyzes the received formats.

The video file retrieving unit 204 is a processing unit that retrieves a video requested by the integration server 100 from the video accumulating unit 205 based on the analysis by the format analyzing unit 203.

The video accumulating unit 205 is a storing unit that accumulates video data of the integrated video delivery system. Video data designated by a user is sliced from the video data stored in the video accumulating unit 205 and is sent to the integration server 100.

The processing parameter accumulating unit 206 is a storing unit that stores information concerning a processing capability of the video accumulation server $200_1$. The processing parameter accumulating unit 206 stores data of the same format as the integration server processing parameter format shown in FIG. 9.

Figures 12, 13:
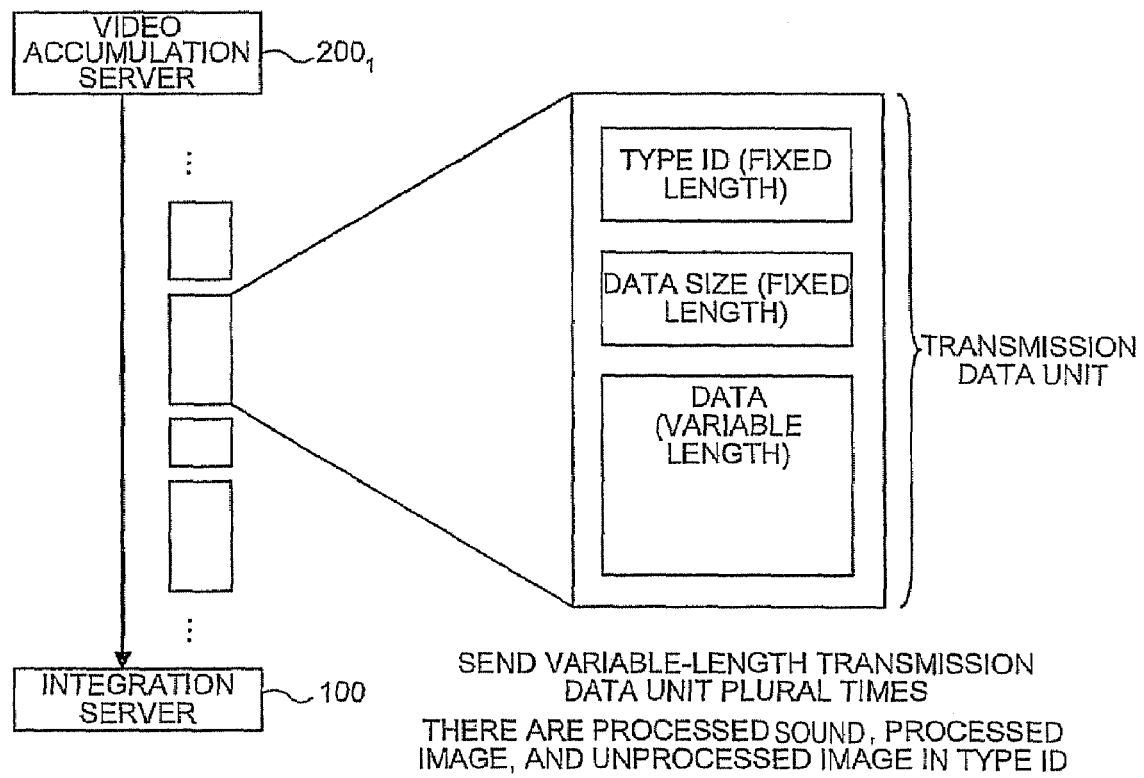
FIG. 12 is a diagram of an example of a processing parameter response format.
FIG. 13 is a diagram of an example of a transmission data format.

The format generating unit 207 is a processing unit that generates a processing parameter response format for responding to the requested video time format sent from the integration server 100. FIG. 12 is a diagram of an example of the processing parameter response format. The processing parameter response format represents a result of examination for processing parameters with respect to the integration server 100.

A status element represents a top of the format. A search element indicates a result of retrieval for a video file. A value of a result attribute in the search element indicates whether the video file is present. A videosrc element indicates information on accumulated videos in the video accumulation server $200_1$, and a coefficient element represents a capability of processing for accumulated videos in the video accumulation server $200_1$. Values of the respective attributes in the respective elements will be explained according to circumstances when calculation of a processing sharing ratio will be explained later.

The format accumulating unit 208 is a storing unit that stores a model of the processing parameter response format. The format generating unit 207 creates a processing parameter response format using the model stored in the format accumulating unit 208.

The conversion request receiving unit 209 is a processing unit that receives conversion processing request information sent from the integration server 100, applies conversion processing designated by a video format designation format to a requested video data, and sends the video data to the integration server 100.

In short, the conversion request receiving unit 209 analyzes the conversion processing request information using the format analyzing unit 203, obtains a requested video file from the video accumulating unit 205 and separates images and voices from a video in the video file using the time slicing and image and voice separating unit 210. Then, the conversion request receiving unit 209 applies conversion processing to the images and the voices using the image format conversion processing unit 211 and the voice format conversion processing unit 212.

When the conversion processing is started, the conversion request receiving unit 209 establishes network connection for transmitting image/voice data from the video accumulation server 200, anew with the video accumulation server communication unit 118 of the integration server 100 based on port number information in the conversion processing request and starts the transmission.

In this case, a data structure used for data transmission is as shown in FIG. 13. The video accumulation server $200_1$ sequentially adds sizes and type IDs to data in order from data, which has come into a transmittable state, and sends the data to the integration server 100. Note that an order of transmission of the data is determined. An unprocessed image, which is subjected to the conversion processing by the integration server 100, is sent first, processed voices are sent next, and processed images subjected to the conversion processing on the video accumulation server 100 side is sent last.

During the transmission of the unprocessed image, the transmission of the processed voices is on standby. "0" is inserted in a part of a size in the last data such that the video accumulation server $200_1$ notifies the integration server 100 to the effect that transmission of all the data has been completed.

The time slicing and image and voice separating unit 210 is a processing unit that slices a video designated in conversion processing request information in accordance with an instruction of the conversion request receiving unit 209 and separates images and voices in the sliced video.

The image format conversion processing unit 211 is a processing unit that performs image format conversion processing for images in a latter half part designated by a processing sharing ratio in the images separated by the time slicing and image and voice separating unit 210.

The voice format conversion processing unit 212 is a processing unit that performs voice format conversion processing for the voices separated from the video by the time slicing and image and voice separating unit 210. The voice format conversion processing unit 212 performs conversion processing for all the voices.

Figure 14:
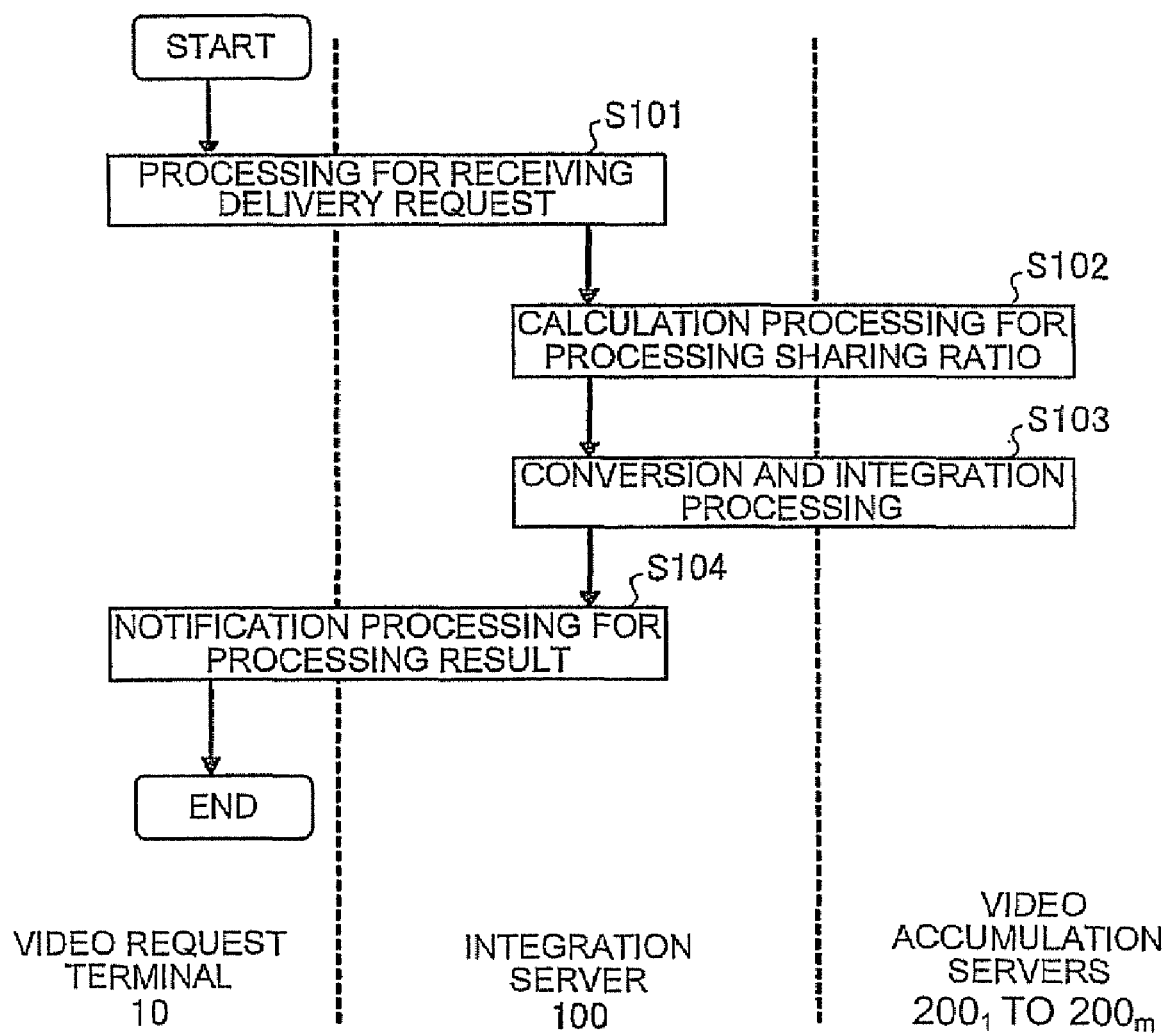
FIG. 14 is a flowchart of a processing procedure of the integrated video delivery system according to the embodiment.

FIG. 14 is a flowchart of the processing procedure of the integrated video delivery system according to the embodiment. The diagram is sectioned into parts for the video request terminal 10, the integration server 100, and the video accumulation server $200_1$ to indicate in which part processing of respective steps in a processing flow is performed. Processing steps extended over the sections indicate cooperative processing by the servers and the terminal. In that case, some network transmission occurs.

As shown in FIG. 14, in the integrated video delivery system, the integration server 100 receives a delivery request from the video request terminal 10 (step S101) and obtains necessary information from the video accumulation servers $200_1$ to $200_m$ and calculates a processing sharing ratio of image format conversion processing (step S102).

Then, the integration server 100 and the video accumulation servers $200_1$ to $200_m$ share conversion of images based on the calculated processing sharing ratio, and the integration server 100 integrates all the videos to generate an integrated video (step S103) and notifies the video request terminal 10 of a result of processing (step S104).

In this way, in the integrated video delivery system, the integration server 100 calculates a processing sharing ratio of image data format conversion processing, and the integration server 100 and the video accumulation servers $200_1$ to $200_m$ share conversion of videos based on the calculated processing sharing ratio, whereby video format conversion processing can be performed efficiently.

Figure 15:
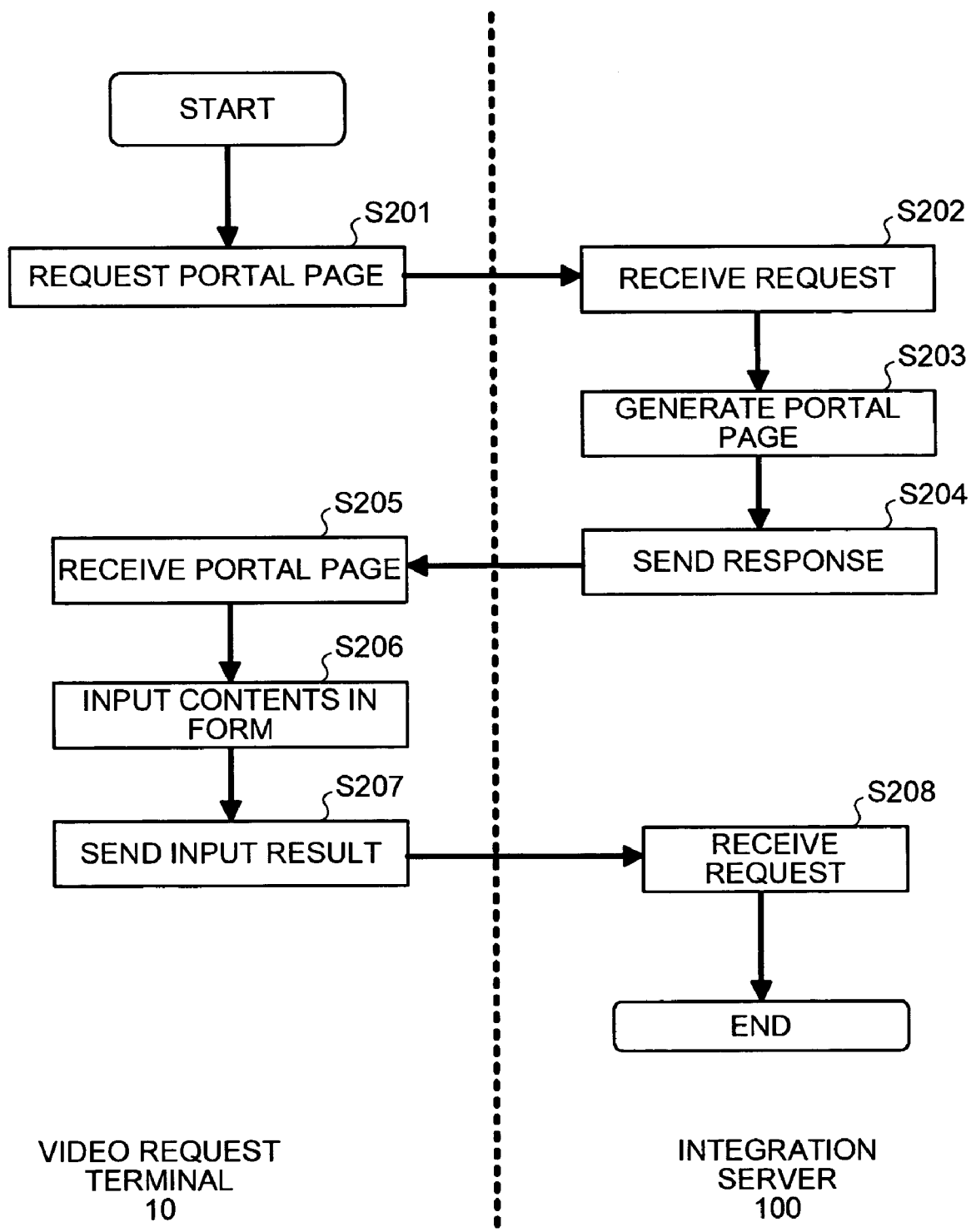
FIG. 15 is a flowchart of a processing procedure of processing for receiving a delivery request.

The processing for receiving a delivery request is a step in which the integration server 100 receives an access from the delivery request terminal 10 via the network I/F 111 and provides an interface through the Web, whereby the delivery request terminal 10 acquires information on a requested video. FIG. 15 is a flowchart of a processing procedure of the processing for receiving a delivery request.

As shown in the figure, first, the video request terminal 10 requests the integration server 100 to send a portal page for video delivery via the Internet 20 (step S201). Then, the delivery request receiving unit 112 of the integration server 100 receives the request (step S202) and sends a portal page generated by the Web interface generating unit 113 as a response (steps S203 to S204).

Then, the video request terminal 10 selects and determines parameters as shown in FIG. 5 using an interface of the acquired portal page (steps S205 to S206) and sends a result of the determination to the integration server 100 (step S207).

The delivery request receiving unit 112 of the integration server 100 receives the result from the delivery request terminal 10 and ends the processing for receiving a delivery request (step S208). As indicated in a step of notifying a result of processing later, an integrated video, which can be displayed on the video request terminal 10, is sent from the integration server 100 to the delivery request terminal 10 finally.

Next, the processing for calculating a processing sharing ratio of step S102 shown in FIG. 14 will be explained. In this step, before actually executing acquisition and conversion and integration processing for videos, the integration server 100 acquires necessary information from respective video accumulation servers, from which videos are acquired, and calculates an appropriate ratio of processing performed in the respective servers in advance. Consequently, efficient processing is realized, and a reduction in time required for video re-generation is realized.

Figure 16:
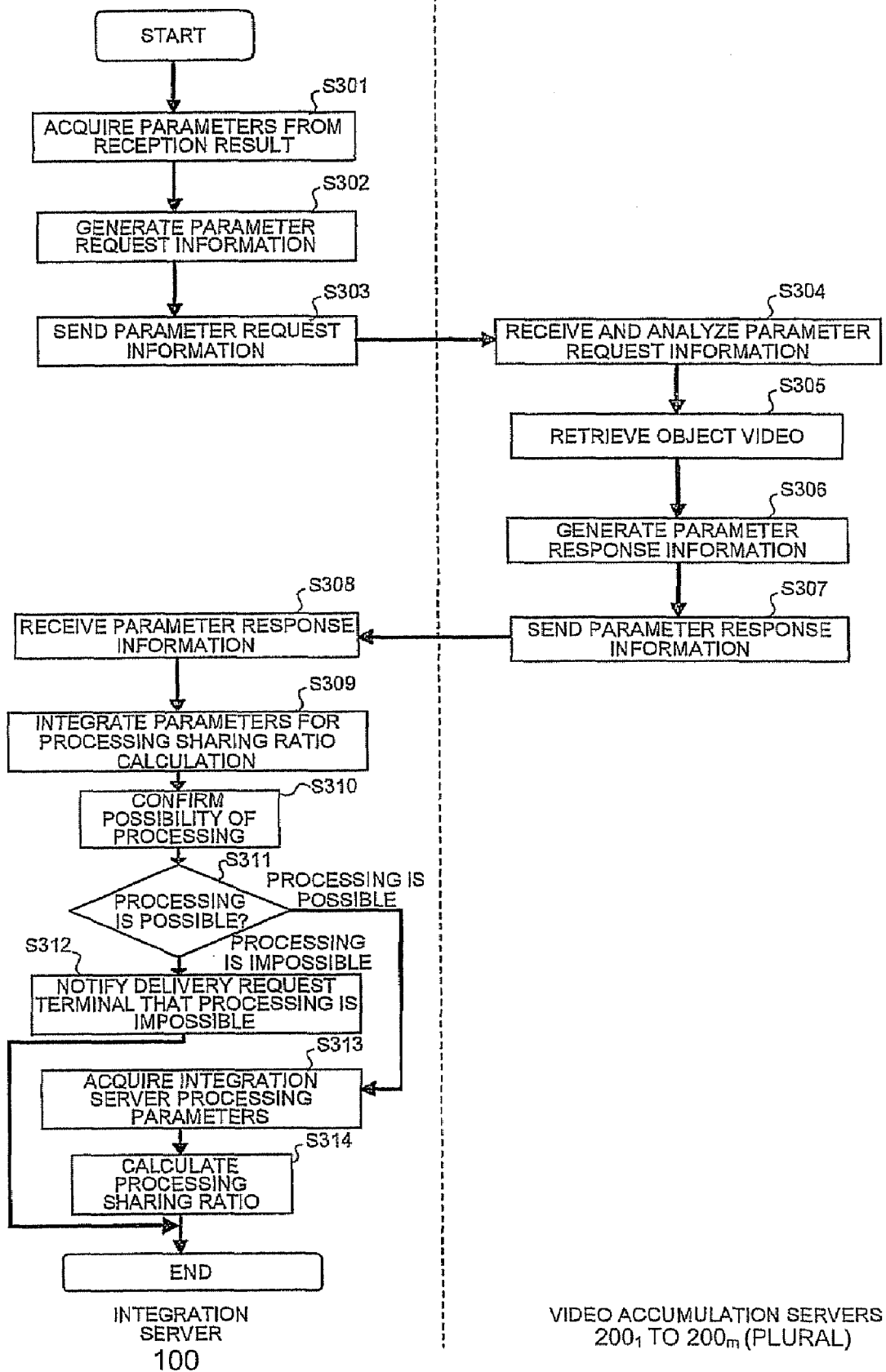
FIG. 16 is a flowchart of a processing procedure of processing for calculating a processing sharing ratio.

FIG. 16 is a flowchart of a processing procedure of the processing for calculating a processing sharing ratio. It is necessary to pay attention to the fact that there are the plural video accumulation servers $200_1$ to $200_m$ in FIG. 16. As shown in the figure, first, the video generation overall control unit 114 of the integration server 100 acquires requested parameters for acquired videos from the delivery request terminal 10 via the delivery request receiving unit 112 (step S301).

The video generation overall control unit 114 generates a video integration format (FIG. 6) and a requested video time format (FIG. 7) based on the requested parameter using the parameter analyzing unit 115 and the format generating unit 116 (step S302). In addition, the video generation overall control unit 114 acquires a video format designation format (FIG. 8) from the format accumulating unit 117.

Then, the video generation overall control unit 114 of the integration server 100 generates the video accumulation server communication units 118 by the number m of the video accumulation servers as threads, and the respective video accumulation server communication units 118 establish network connection to the video accumulation servers $200_1$ to $200_m$.

The respective video accumulation server communication units 118 send the requested video time format and the video format designation format, which were generated earlier, to the video accumulation servers $200_1$ to $200_m$ as parameter request information to acquire parameters for calculating a processing sharing ratio (step S303).

Then, the parameter request receiving unit 202 of the video accumulation servers $200_1$ to $200_m$, which have received the requested video time format and the video format designation format via the network I/F 201, analyzes the received formats in the format analyzing units 203 (step S304).

The video accumulation servers $200_1$ to $200_m$ access the video accumulating units 205 using the video file retrieving units 204 to confirm presence of a requested video slot including time to be an object (step S305). Then, the video accumulation servers $200_1$ to $200_m$ acquire processing capabilities of the servers themselves corresponding to the received video format designation format from the processing parameter accumulating units 206. Thereafter, the video accumulation servers $200_1$ to $200_m$ generate a processing parameter response format (FIG. 12) for responding to the integration server 100 based on the format, which is acquired from the format accumulating units 208, in the format generating unit 207 (step S306) and send the processing parameter response format to the integration server 100 (step S307).

Then, the video accumulation server communication units 118 of the integration server 100 receive the processing parameter response format (step S308). The integration server 100 collects results of reception in the respective video accumulation server communication units 118 once in the video generation overall control unit 114 (step S309).

The integration server 100 judges possibility of processing in the processing propriety judging unit 119 of the integration server 100 (steps S310 to S311). When it is found that contents cannot be processed, for example, when a video at time requested by the delivery request terminal 10 cannot be acquired, the integration server 100 ends the entire processing and notifies the delivery request terminal 10 of the result in a form of an HTML page (step S312).

On the other hand, when it is judged in the step of confirming possibility of processing that processing is possible, the integration server 100 acquires processing parameters of the integration server 100 itself in a format (FIG. 10) decided by the processing parameter accumulating unit 120 (step S313).

Then, the integration server 100 performs calculation of a processing sharing ratio in the processing sharing ratio calculating unit 121 based on the processing parameters of the integration server 100 together with processing parameters of the video accumulation servers $200_1$ to $200_m$ that are obtained from the acquired processing parameter response format from the video accumulation servers $200_1$ to $200_m$ through the parameter analyzing unit 115 (step S314).

In this way, the integration server 100 calculates a processing sharing ratio based on the processing parameter response format acquired from the video accumulation servers $200_1$ to $200_m$ by the processing sharing ratio calculating unit 121 and the processing parameters of the integration server 100 itself, whereby video format conversion processing can be subjected to distributed processing efficiently.

Figure 17:
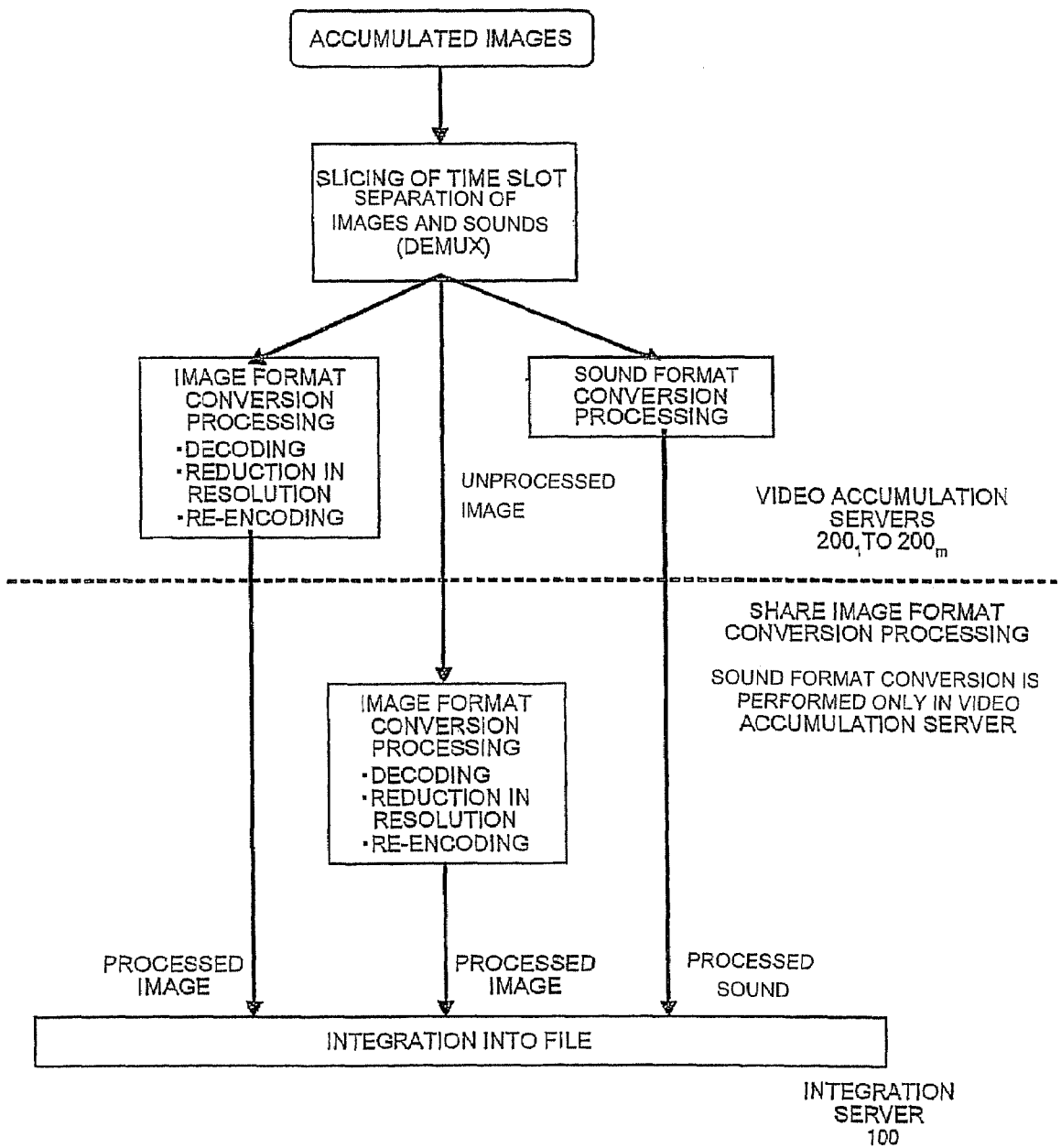
FIG. 17 is an explanatory diagram for explaining processing sharing in the video accumulation server and the integration server.

Here, the calculation of a processing sharing ratio of processing in the video accumulation servers $200_1$ to $200_m$ and the integration server 100 will be explained in detail. FIG. 17 is an explanatory diagram for explaining processing sharing in the video accumulation servers $200_1$ to $200_m$ and the integration server 100.

As shown in the figure, after receiving actual processing in the conversion request receiving unit 209, when the video accumulation servers $200_1$ to $200_m$ slice a video slot requested by the integration server 100 with the time slicing and image and voice separating units 210, the video accumulation servers $200_1$ to $200_m$ divide this one image slot, performs one processing from decoding to re-encoding in the image format conversion processing units 211 of the video accumulation servers $200_1$ to $200_m$ and performs the other processing from decoding to re-encoding in the image format converting processing unit 122 on the integration server 100 side.

The voice conversion processing units 212 on the video accumulation servers $200_1$ to $200_m$ side perform conversion of voices entirely. Consequently, the video accumulation servers $200_1$ to $200_m$ send a former half part of divided images to the integration server 100 in a state of unprocessed images, and the integration server 100 performs format conversion processing. The video accumulation servers $200_1$ to $200_m$ apply format conversion processing to a latter half part of the divided images in advance and, then, send the latter half part of the divided images to the integration server 100 in a state of processed images.

Figure 18:
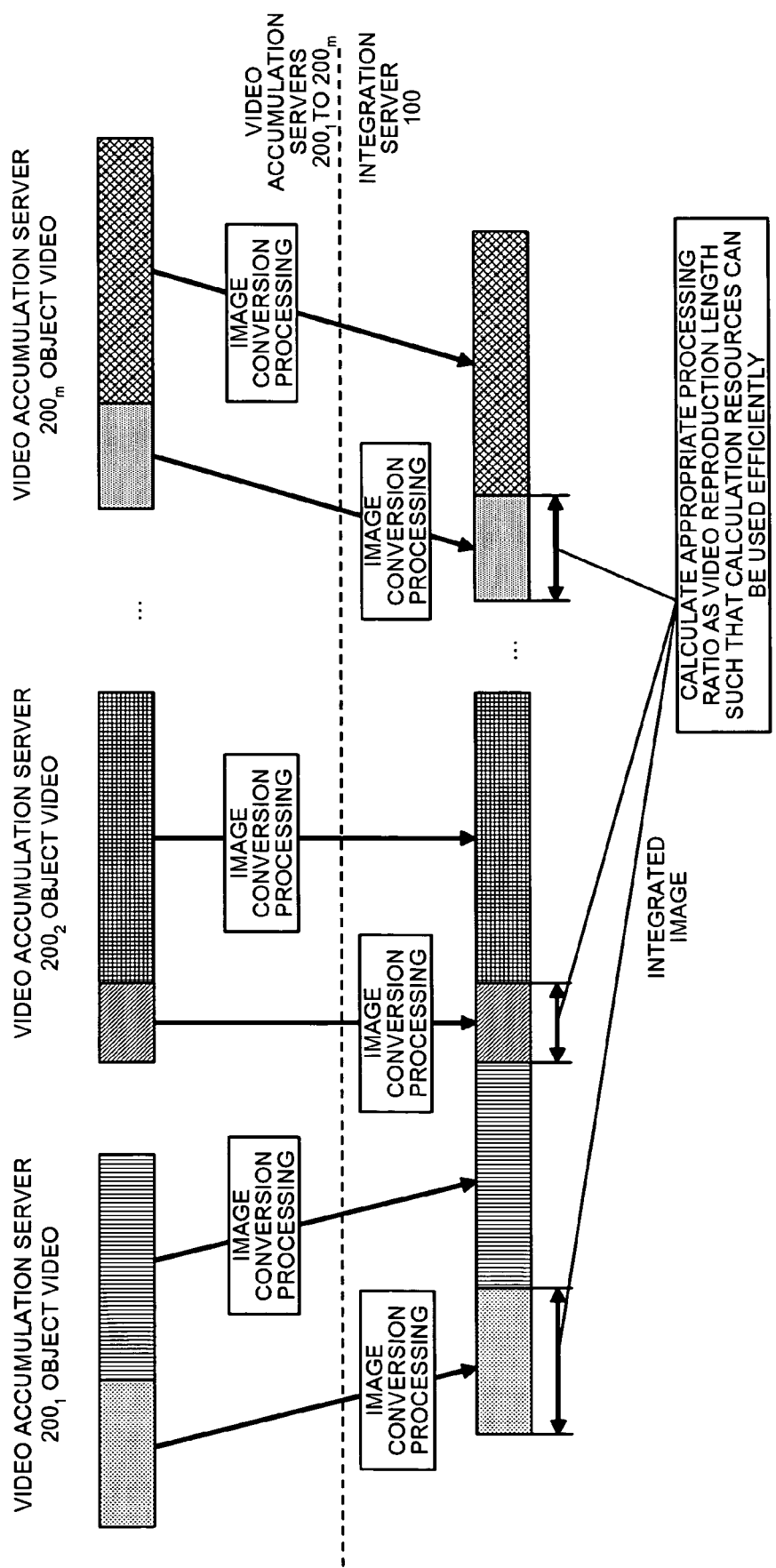
FIG. 18 is an explanatory diagram for explaining processing sharing by video time division.

Then, the images and the voices subjected to the conversion processing are integrated in the integration processing unit 123 of the integration server 100. Here, the images subjected to the format conversion in the respective places are re-constituted as shown in FIG. 18. The images of the sliced video are divided at one point. The former half images are converted in the integration server 100, and the latter half images are converted in the video accumulation servers $200_1$ to $200_m$. The former half images and the latter half images are combined on a time axis, and one continuous image is created.

As shown in FIG. 18, the calculation of a processing sharing ratio means determining a processing division point for images in the respective video accumulation servers appropriately based on the acquired processing parameters such that time required for the entire processing is minimized.

Parameters given in the steps described above and parameters to be calculated from the parameters are as shown in FIG. 19. The respective parameters will be hereinafter explained.

The number of integration object accumulation servers m indicates videos of how many video accumulation servers are integrated. For example, when m is 3, this means that videos are acquired from video accumulation servers in three places and combined in a time order to integrate the videos as one video. This parameter is a total number of video elements in the video integration format shown in FIG. 6.

An integration order video accumulation server number n ($1 \leq n \leq m$) indicates a number of one video accumulation server among video accumulation servers in m places or a number of a video. An order of reproduction of videos as a result of integration is determined according to a value of n.

For example, when m is 3, values of 1 to 3 are given to the video accumulation servers as integration order video accumulation server numbers such that videos are integrated in an order of reproduction. Parameters depending on object video accumulation servers are represented in a form of X(n) after that. In the video element and the audio element in the video integration format shown in FIG. 6, this parameter is an order of appearance of these elements.

A bit rate of images before conversion $V_{bit}(n)$ indicates an amount of information in an image format accumulated in video accumulation servers. Since amounts of information in an image format accumulated in the respective video accumulation servers are different, the amount of information depends on n. This is a value of a bps attribute in the videosrc element in the processing parameter response format shown in FIG. 12.

A bit rate of images after conversion $V'_{bit}(n)$ indicates an amount of information of videos when the videos are delivered to the delivery request terminal 10. For example, since an upper limit of an amount of information is decided by limitation of functions, the delivery request terminal 10 reduces an amount of information from accumulated videos as required. This is a value of the bps attribute in the video element in the video format designation format shown in FIG. 8.

A bit rate of voices after conversion $A'_{bit}(n)$ indicates an amount of information of voices after voices in videos accumulated in video accumulation servers are converted in the video accumulation servers. The voice conversion processing is not performed in the integration server 100 and is performed only in the respective video accumulation servers.

In this voice conversion processing, as in the case of the bit rate of images after conversion, an amount of information is reduced at the time of format conversion for voices to satisfy a reproduction format of the delivery request terminal 10.

This is a value of the bps attribute in the audio element in the video format designation format shown in FIG. 8.

A frame rate of images before conversion $F_{rate}(n)$ indicates a frame rate of images before conversion (the number of images to be displayed per one second). This is a value of the fps attribute in the videosrc element in the processing parameter response format shown in FIG. 12.

A demux coefficient $C_{demux}(n)$ represents time required for demux processing and reproduction time in the integration order video accumulation server number n as a ratio. Here, the demux processing indicates processing for separating and extracting an image part and a voice part from a single file in which images and voices are stored.

For example, when $C_{demux}(3)$ is 0.1, this indicates that one second is required for demuxing a video with a reproduction length of 10 seconds with respect to an object file with the integration order video accumulation server number of "3". This is a value of the demux attribute in the coefficient element in the processing parameter response format shown in FIG. 12.

An image conversion processing coefficient $C_{video}(n)$ represents time required for image conversion processing and reproduction time in the integration order video accumulation server number n as a ratio. The image conversion processing indicates a combination of processing of decoding of an image format, processing of conversion to resolution of the delivery request terminal 10, and processing of re-encoding of the image format corresponding to the delivery request terminal 10 in the respective video accumulation servers.

For example, when $C_{video}(2)$ is 0.5, this indicates that five seconds are required for converting an image with a reproduction length of ten seconds with respect to an object image with the integration order video accumulation server number of "2". This is a value of the video attribute in the coefficient element in the processing parameter response format shown in FIG. 12.

A voice conversion processing coefficient $C_{audio}(n)$ represents time required for voice conversion processing and reproduction time in the integration order video accumulation server number n as a ratio. The voice conversion processing indicates conversion processing in a conversion and reproduction method for a sampling frequency and the number of quantized bits.

For example, when $C_{audio}(1)$ is 0.3, this indicates that three seconds are required for converting a voice with a reproduction length of 10 seconds with respect to an object voice with the integration order video accumulation server number of "1".

An integration processing coefficient $C_{integrate}(n)$ represents time required for integration processing and reproduction time in the integration order video accumulation server number n as a ratio. Here, the integration processing indicates processing for integrating plural images and voices in an order of reproduction in a file format that the delivery request terminal 10 can acquire and display.

For example, when $C_{integrate}(3)$ is 0.25, this indicates that 2.5 seconds are required for generating an integrated video with a reproduction length of ten seconds with respect to an object video with the integration order video accumulation server number of "3". This is a value of the integrate attribute in the coefficient element in the integration server processing parameter format shown in FIG. 10.

A total requested video length $L_{all}(n)$ indicates a reproduced video length requested by the delivery request terminal 10 with respect to the integration order video accumulation server number n. This is a difference between a value of the clip-begin attribute and a value of the clip-end attribute in the video element in the video integration format shown in FIG. 6 or the requested video time format shown in FIG. 7.

An integration server processing video length $L_I(n)$ indicates a reproduced video length, to which image conversion processing is applied on the integration server 100 side, among a reproduced video length requested by the delivery request terminal 10 with respect to the integration order video accumulation server number n. This is a parameter with an unknown value that is calculated this time.

An image conversion processing coefficient $C_{videoI}$ represents time required for image conversion processing and reproduction time in the integration server 100 as a ratio. For example, when $C_{videoI}$ is 0.4, this indicates that four seconds are required for converting an image with a reproduction length of ten seconds with respect to images received from the respective video accumulation servers. This is a value of the video attribute in the coefficient element in the integration server processing parameter format shown in FIG. 10.

An effective network band N is calculated by dividing an amount of information, which can be communicated per a unit time of a network in the integration server, with the number of video accumulation servers. This indicates that the respective video accumulation servers can communicate with the integration server 100 in the band N. This is a value of the bandwidth attribute in the network element in the integration server processing parameter format shown in FIG. 10.

The integration server processing video length $LI(n)$ ($1 \leq n \leq m$) in the number of integration object accumulation servers m is determined using these parameters and expressions (1) to (7) shown in FIG. 20. In expressions (1) to (7), execution procedures of the respective processing to be actually performed are modeled and represented as formulas.

In the modeling in this embodiment, there are several points that should be noted. One is presence of parallel processing. For example, in the video accumulation servers $200_1$ to $200_m$, the processing for separating images/voices and the voice format conversion processing or the image format conversion processing are performed in parallel at certain time.

Looking at the system as a whole, the kinds of processing performed in the respective video accumulation servers are kinds of parallel processing completely independent from each other because there is no dependency relation among the kinds of processing. In addition, the network transmission processing and the calculation processing using a CPU and a memory are also performed in parallel.

On the other hand, the unprocessed image transmission, the processed voice transmission, and the processed image transmission are not performed simultaneously. In this case, processing in a later stage is in a relation of queuing with processing in an earlier stage until the processing in the former stage ends. For example, even if processed voice data that can be transmitted is already present, the voice data is not transmitted while unprocessed images are sent, and transmission of the voice data is started after the transmission of the unprocessed images ends.

The queuing of processing occurs not only when processing in an earlier stage does not end but also when data necessary for processing are gathered. For example, it is necessary to insert partial elements of an image and a voice into each other to perform integration processing such that the image and the voice synchronize with each other. Thus, not only a processed image in a start part but also a processed voice is necessary, and processing cannot be started until a first processed voice is delivered.

However, concerning processing in a dependency relation, since transmission of data is performed by a minimum unit, it is possible to start processing and perform the processing in a stream-like manner if data necessary for first kind of processing are gathered. For example, in the step of separating images and voices, separated images and voices are passed to the next processing without waiting for separation of all images and voices in an object slot.

In addition, it is assumed that time when data is sent from the video accumulation servers $200_1$ to $200_m$ and time when the integration server 100 receives the data are identical. In other words, it is assumed that a delay of communication is not caused by network transmission. In the respective expressions, these assumptions are taken into account. The respective expressions will be hereinafter explained.

Integration server total processing accumulated time TI(n) indicated in expression (1) is time required until the end of integration processing for an integration order video accumulation server number n when it is assumed that start time for the all kinds of processing is "0" in the integration server 100.

$T_f(n)$ is any one of video accumulation server processing time Ts(n), integration server image conversion processing time $T_{Iconv}v(n)$, and integration server integration processing accumulated time $T_{integrate}(n)$, which are processing time for three kinds of processing performed in parallel, and is equal to time required for slower processing.

Since the video accumulation servers $200_1$ to $200_m$ and the integration server 100 perform parallel processing, basically, the integration server total processing accumulated time $T_f(n)$ is time of slower processing of the video accumulation servers $200_1$ to $200_m$ or the integration server 100, that is, the video accumulation server processing time Ts(n) or the integration server image conversion processing time $T_{Iconv}v(n)$. Here, since the integration processing is also performed in parallel, it is assumed that the integration processing for last data in the integration server 100 can be neglected. However, it is possible that all image data and voice data of the video accumulation server $200_n$ are gathered, and it is necessary to perform only the integration processing. Thus, in that case, the integration server total processing accumulated time $T_f(n)$ is the integration server integration processing accumulated time $T_{integrate}(n)$.

The video accumulation server processing time Ts(n) indicated in expression (2) is time until all the kinds of processing performed on the video accumulation server $200_n$ side and data transmission of all processing results end when it is assumed that start time for all the kinds of processing is assumed to be "0" in the video integration server $200_n$ with the integration order video accumulation server number n.

Ts(n) is time, which consists of a sum of time $T_{Saudio}(n)$ required for conversion processing of voice data and transmission of the data and time $T_{Ssend}v(n)$ required for transmission of processed images on the video accumulation server $200_n$ side, or time $T_{Sconv}v(n)$ required for image conversion processing on the video accumulation server $200_n$ side. Ts(n) is equal to time required for slower processing.

Here, the former is larger when the voice conversion processing takes longer time. In this case, since it is necessary to send processed image data after the transmission of the voice data, the time $T_{Ssend}v(n)$ required for the transmission of processed images is added. On the other hand, the latter is larger when the image conversion processing takes longer time. In this case, since processed image data is sent while image conversion is performed, it is unnecessary to add the time $T_{Ssend}v(n)$ required for the transmission of processed images.

Integration server image conversion processing time $T_{Iconv}v(n)$ indicated in expression (3) is time until image conversion processing for the integration order video accumulation server number n on the integration server 100 side ends when it is assumed that start time for processing is "0".

$T_{Iconv}v(n)$ is a sum of time $T_{Iconv}v(n-1)$ required for the image conversion processing on the integration server 100 side for object images with the integration order video accumulation server number up to "n-1" and time $L_f(n) \cdot C_{videoI}$ required for the image conversion processing on the integration server 100 side for an object image with the integration order video accumulation server number n.

Integration server integration processing accumulated time $T_{integrate}(n)$ indicated in expression (4) is time required until the end of an integration processing part when it is assumed that start time for entire processing is "0" for a video with the integration order video accumulation server number n in the integration server 100. This is calculated assuming that there is no queuing of data after starting integration processing.

$T_{integrate}(n)$ is a sum of time when the integration processing for object image and voice information with the integration order video accumulation server number n can be started and time $L_{all}(n) \cdot C_{integrate}(n)$ required for the integration processing. Here, the time when the processing can be started is time $T_f(n-1)$ required for the integration processing for object image and voice information with the integration order video accumulation server number up to "n-1" or time $(L_f(n) \cdot C_{demux}(n) + V_{bit}(n)/(F_{rate}(n) \cdot N))$ required until demux ends for all reproduced video length parts, to which the image conversion processing is applied on the integration server 100 side, and last data is sent. $T_{integrate}(n)$ is equal to time required for slower processing.

Video accumulation server voice conversion processing time $T_{Saudio}(n)$ indicated in expression (5) is time required for voice conversion processing and transmission of voice data subjected to the processing in the video accumulation server $200_n$ with the integration order video accumulation server number n.

$T_{Saudio}(n)$ is time $L_{all}(n) \cdot C_{audio}(n)$ required for conversion of a voice of an object part in the integration order video accumulation server number n or time $(L_f(n) \cdot C_{demux}(n) + V_{bit}(n)/(F_{rate}(n) \cdot N) + L_{all}(n) \cdot A'_{bit}(n)/N)$ required for data transmission after demux for the object part is performed. $T_{Saudio}(n)$ is equal to time required for slower processing. In other words, $T_{Saudio}(n)$ is time when processing time for voice conversion is longer or time for sending image data before conversion and voice data after conversion are sent after demux.

Video accumulation server processing image transmission time $Ts_{send}v(n)$ indicated in expression (6) is time required for transmitting data subjected to the image conversion processing to the integration server 100 in the video accumulation server $200_n$ in the integration order video accumulation server number n.

$Ts_{send}v(n)$ is a value calculated by dividing an amount of data subjected to the image conversion processing $(L_{all}(n) - L_f(n)) \cdot V'_{bit}(n)$ with the effective network band N in the video accumulation server $200_n$.

Video accumulation server image conversion processing time $Ts_{conv}v(n)$ indicated in expression (7) is time required for image conversion processing on the video accumulation server $200_n$ side. $Ts_{conv}v(n)$ is indicated by a sum of start time $L_f(n) \cdot C_{demux}(n)$ for the image conversion processing on the video accumulation server $200_n$ side with the integration order video accumulation server number n and time $(L_{all}(n) - L_f(n)) \cdot C_{video}(n)$ required for conversion processing for images to be processed. Here, start time for the image conversion processing of the video accumulation server $200_n$ side processing is start time for demux of the video accumulation server $200_n$ side processing for object images.

In this case, time required for all kinds of processing can be assumed to be $f(L_I(1) \ldots L_I(m))=T_I(m)$. Thus, calculation of an optimal processing sharing ratio is a matter of determining parameters $LI(1) \ldots LI(m)$ satisfying $MIN(TI(m))$. This can be calculated from the parameters and expressions given above using an iterative method like a conjugate gradient method.

An example in which values of the respective parameters are determined will be described specifically. When the number of integration object accumulation servers is "3", values of $L_I(1)$, $L_I(2)$, and $L_I(3)$ for reducing a value of $T_I(3)$ is calculated. In addition, to facilitate understanding of the example, units are also indicated for parameters having the units.

Values of the respective parameters are as described below.
Number of integration object accumulation servers: m=3
Bit rate for images before conversion (bps):

$$V_{bit}(1)=V_{bit}(2)=V_{bit}(3)=384000$$

Bit rate for images after conversion (bps):

$$V'_{bit}(1)=V'_{bit}(2)=V'_{bit}(3)=64000$$

Bit rate for voices after conversion (bps): $A'_{bit}(1)=A'_{bit}(2)=A'_{bit}(3)=8000$
Frame rate for images before conversion: $F_{rate}(1)=F_{rate}(2)=F_{rate}(3)=15$
demux coefficient: $C_{demux}(1)=C_{demux}(2)=C_{demux}(3)=0.1$
Image conversion processing coefficient:

$$C_{video}(1)=C_{video}(2)=C_{video}(3)=0.33$$

Voice conversion processing coefficient:

$$C_{audio}(1)=C_{audio}(2)=C_{audio}(3)=0.23$$

Integration processing coefficient:

$$C_{integrate}(1)=C_{integrate}(2)=C_{integrate}(3)=0.01$$

Total requested video length (ms): $L_{all}(1)=L_{all}(2)=L_{all}(3)=10000$
Integration server processing video length (ms): $L_I(1)$, $L_I(2)$, $L_I(3)$, all of which are unknown numbers
Image conversion processing coefficient: $C_{videoI}=0.33$
Effective network band (bps): N=20000000
Units are described as follows.
bps: an amount of bits that can be transferred in one second (bits per second) in a network band or a moving image
fps: the number of images displayed in one second (frame per second)
ms: millisecond When these parameters are substituted in expressions (1) to (7), the following expressions (a) to (f) are obtained.

$$T_I(3)=MAX(Ts(3), 0.33L_I(1)+0.33L_I(2)+0.33L_I(3), MAX(T_I(2), 0.1L_I(3)+100)) \quad (a)$$

$$Ts(3)=MAX(MAX(2300, 0.1L_I(3)+4)+32-0.0032L_I(3), -0.23L_I(3)+3300) \quad (b)$$

$$TI(2)=MAX(Ts(2), 0.33L_I(1)+0.33L_I(2), MAX(T_I(1), 0.1L_I(2))+100) \quad (c)$$

$$Ts(2)=MAX(MAX(2300, 0.1L_I(2)+4)+32-0.0032L_I(2), -0.23L_I(2)+3300) \quad (d)$$

$$T_I(1)=MAX(Ts(1), 0.33L_I(1), 0.1L_I(1)+100) \quad (e)$$

$$Ts(1)=MAX(MAX(2300, 0.1L_I(1)+432-0.0032L_I(1), -0.23L_I(1)+3300) \quad (e)$$

Moreover, when (b) to (f) are substituted in expression (a) one after another, a polynomial in which $T_I(3)$ and $L_I(1)$ to $L_I(3)$ are not decided is obtained. In addition, there is a constraint $0 \leq L_I(n) \leq 10000$ ($1 \leq n \leq 3$). When the entire image conversion processing is performed in the integration server 100 in this case, that is, when $L_I(1)=L_I(2)=L_I(3)=10000$, $T_I(3)=9900$. When the entire video conversion processing is performed in advance on video accumulation servers side, that is, $L_I(1)=L_I(2)=L_I(3)=0$, $T_I(3)=3500$.

On the other hand, in this method, $L_I(1)$ to $L_I(3)$ for minimizing $T_I(3)$ are calculated using the iterative method such as the conjugate gradient method. For example, when $L_I(1)=L_I(2)=L_I(3)=0$ is given as an initial value and iterative calculation according to the conjugate gradient method is performed, values of $L_I(1)=3362$, $L_I(2)=2734$, and $L_I(3)=2301$ can be obtained when $T_I(3)=2771$.

This indicates that, compared with the time when the entire image conversion processing is performed in the integration server 100 and the time when the entire video conversion processing is performed in advance on video accumulation servers $200_1$ to $200_3$ side as described above, it is seen that total processing time is reduced and it is possible to calculate a processing sharing ratio for reducing the total processing time.

Processing sharing ratios are different despite the fact that processing capabilities of the respective video accumulation servers are equal and requested video lengths are the same. This indicates that priorities of respective kinds of processing are different because it is necessary to integrate videos in an order of reproduction. In this respect, the calculated values and actual processing contents coincide with each other.

As another example in which total requested video lengths for the respective video accumulation servers are changed without changing the other parameters, a case in which different video lengths, Lall(1)=15000, Lall(2)=10000, and Lall(3)=5000, are requested for the respective video accumulation servers will be considered.

In this case, when the entire image conversion processing is performed in the integration server 100, that is, when $L_I(1)=15000$, $L_I(2)=10000$, and $L_I(3)=5000$, $T_I(3)=9900$ as in the above example. In addition, when the entire image conversion processing is performed in advance on video accumulation servers $200_1$ to $200_3$ side, that is, $L_I(1)=L_I(2)=L_I(3)=0$, $T_I(3)=5100$.

On the other hand, when $L_I(1)=L_I(2)=L_I(3)=0$ is given as an initial value and the conjugate gradient method is used as in the above example, values of $L_I(1)=10498$, $L_I(2)=0$, and $L_I(3)=0$ can be obtained when $T_I(3)=3614$.

As described above, the integration server 100 according to this embodiment is capable of calculating a processing sharing ratio corresponding to given requested video lengths and values of processing parameters.

The step is a step of requesting the video accumulation servers $200_1$ to $200_m$ to perform conversion processing and actually performing conversion and integration processing using a calculated processing sharing ratio.

FIG. 21 is a flowchart of a processing procedure of the conversion and integration processing. The parameter analyzing unit 115 and the format generating unit 116 of the integration server 100 generate conversion processing request information (step S401).

In addition to the requested video time format and the video format designation format used in the former step of acquiring processing parameters, a processing sharing ratio notification format (FIG. 9) including information on the calculated processing sharing ratio is included in the conversion processing request information. A value of the length attribute of the getoriginalvideo element in the processing sharing ratio notification format shown in FIG. 9 is a video length, which the integration server 100 receives in a state of an unprocessed image, described by a unit of millisecond.

In addition, since it is necessary to establish connection, which is necessary for transmitting image/voice data through a network from the video accumulation servers $200_1$ to $200_m$ side, separately from network connection for conversion request, information on a necessary port number is also included in the conversion processing request information. The integration server 100 sends these pieces of information to the respective video accumulation servers through the video accumulation server communication units 118 (step S402).

Then, the conversion request receiving units 209 of the respective video accumulation servers receive the conversion processing request information (step S403). The video accumulation servers analyze various conversion processing parameters in the format analyzing units 203 and acquire the conversion processing parameters (step S404).

Then, the video accumulation servers acquire an actually designated video file from the video accumulating units 205 this time (step S405) and share conversion processing with the integration server 100. The integration server 100 performs integration processing (step S406).

Next, the notification processing for a processing result in step S104 shown in FIG. 14 will be explained. This step is a step of notifying a generated video for the delivery request terminal 10 and performing delivery processing for the delivery request terminal 10.

FIG. 22 is a flowchart of a processing procedure of the notification processing for a processing result. As shown in the figure, first, to make it possible to access a generated video for the delivery request terminal from the delivery request terminal 10, the Web interface generating unit 113 of the integration server 100 generates a conversion result response page that is an HTML page including a link of a file to the video for the delivery request terminal (step S501). The integration server 100 sends the page to the delivery request terminal 10 (step S502).

The delivery request terminal 10 receives the sent page (step S503) and sends a request for the video for the delivery request terminal in a link destination of the page (step S504). Finally, the integration server 100 having received the request sends a delivery video (steps S505 and S506), and the delivery request terminal 10 acquires and reproduces the video (steps S507 and S508).

Figure 23:
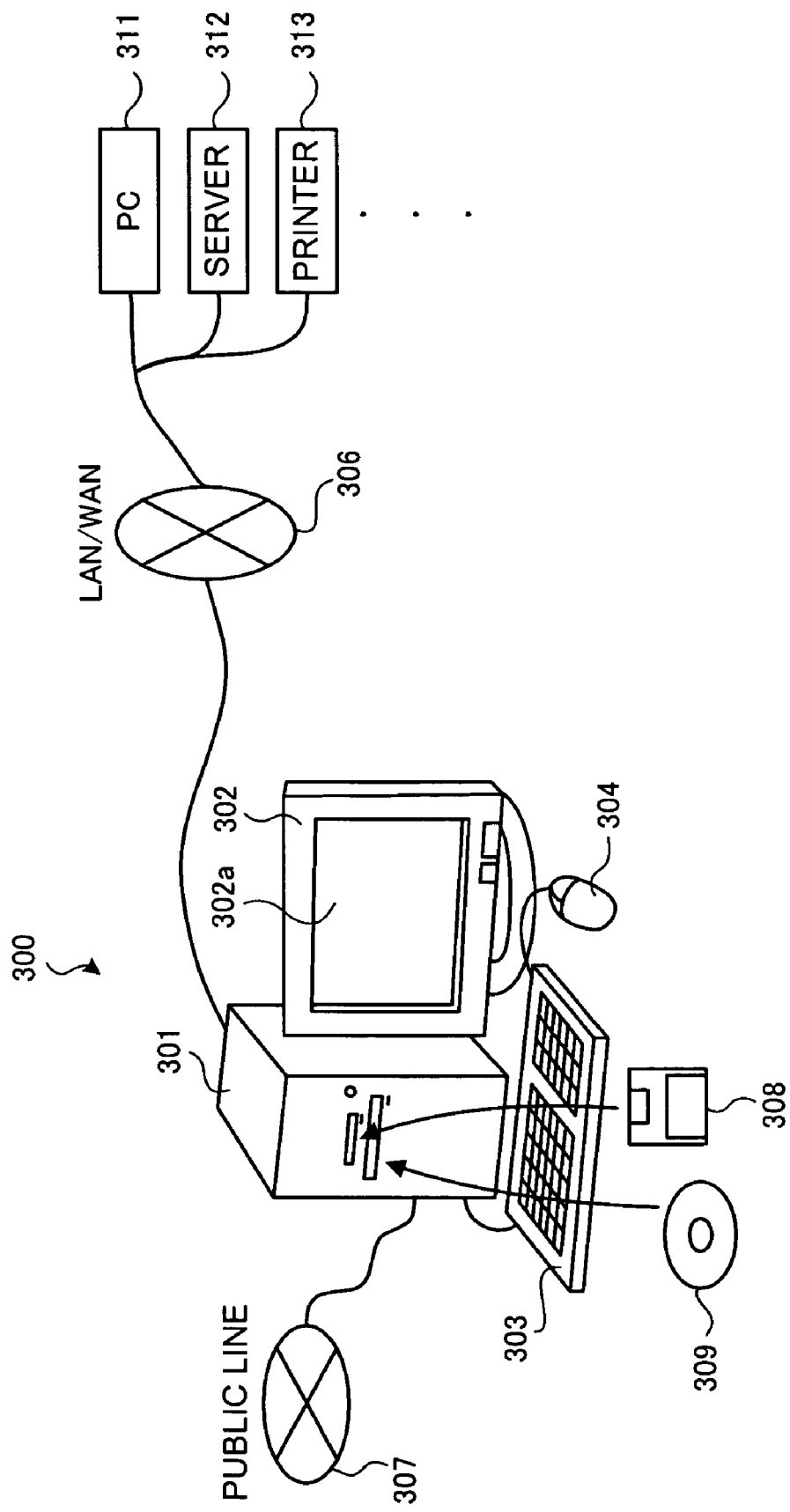
FIG. 23 is a diagram of a computer system operating as the integration server according to the embodiment.

FIG. 23 is a diagram of the computer system operating as the integration server 100 according to the embodiment. The respective functional units of the integration server 100 shown in FIG. 4 operate as a video integration program that is executed in the computer system shown in FIG. 23.

As shown in FIG. 23, the computer system 300 includes a body unit 301, a display 302 that displays information on a display screen 302*a* according to an instruction from the body unit 301, a keyboard 303 for inputting various kinds of information to the computer system 300, a mouse 304 for designating an arbitrary position on the display screen 302*a* of a display 302, a LAN interface for making connection to a LAN 306 or a wide area network (WAN), and a modem for making connection to a public line 307.

Here, in addition to another computer system (PC) 311, a server 312, and a printer 313, the LAN 306 connects the Internet 20, the dedicated network 30, and the like shown in FIG. 1 and the computer system 300.

Figure 24:
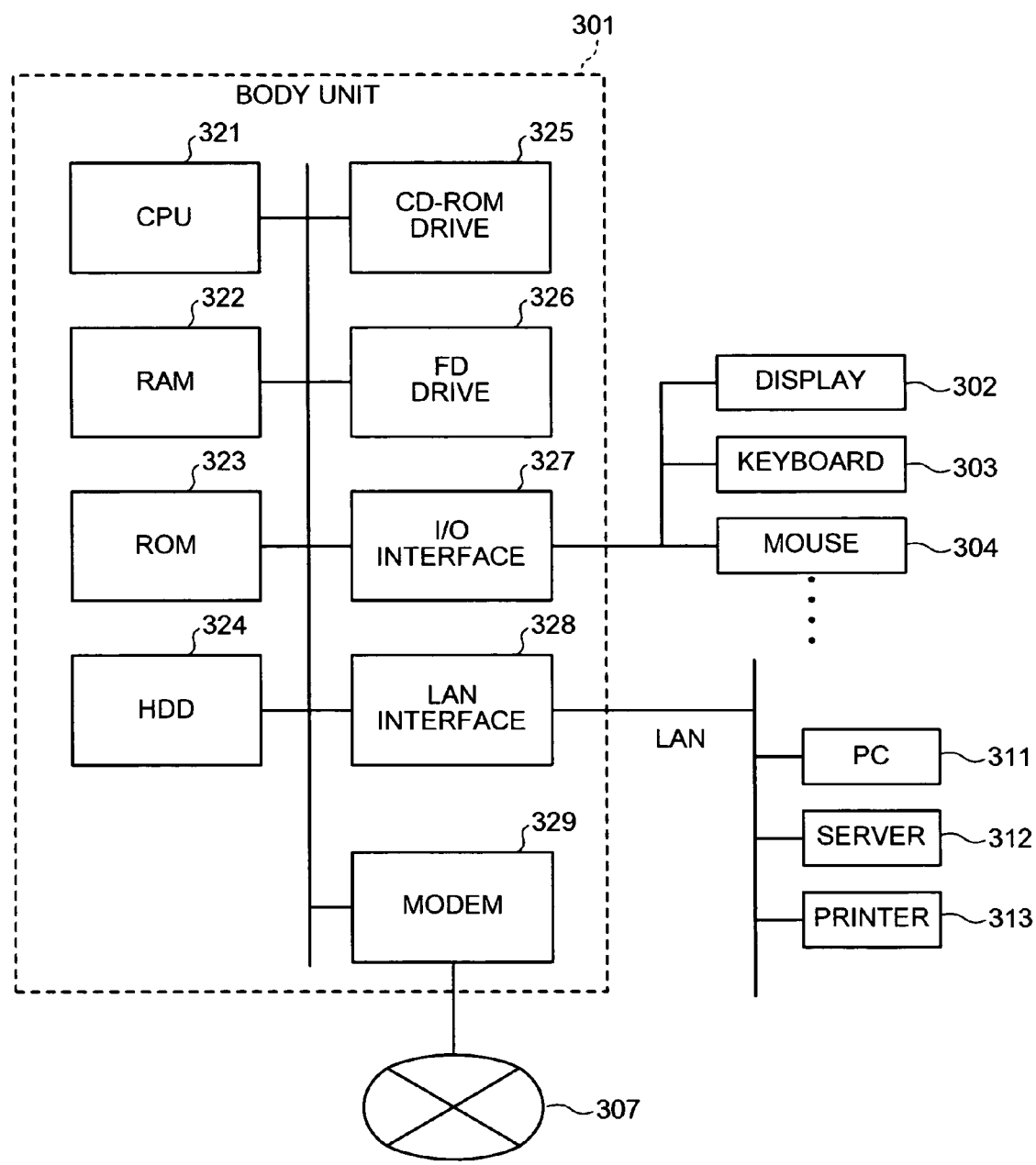
FIG. 24 is a functional block diagram of a structure of a main body portion shown in FIG. 23.

FIG. 24 is a functional block diagram of a structure of the body unit 301 shown in FIG. 23. As shown in the figure, the body unit 301 includes a CPU 321, a RAM 322, a ROM 323, a hard disk drive (HDD) 324, a CD-ROM driver 325, a FD drive 326, an I/O interface 327, a LAN interface 328, and a modem 329.

The video integration program executed in the computer system 300 is stored in a portable storage medium such as a floppy disk (FD) 308, a CD-ROM 309, a DVD disk, a magneto-optical disk, or an IC card and read out from the storage medium to be installed in the computer system 300.

Alternatively, the video integration program is stored in a database of the server 312 connected via the LAN interface 328, a database of another computer system (PC) 311, or the like and read out from the database to be installed in the computer system 300.

The installed video integration program is stored in the HDD 324 and executed by the CPU 321 using the RAM 322, the ROM 323, and the like.

In this embodiment, the processing sharing ratio calculating unit 121 of the integration server 100 calculates an optimal processing sharing ratio for image format conversion processing between the integration server 100 and the respective video accumulation servers. Then, the image format conversion processing unit 122 of the integration server 100 and the image format conversion processing units 211 of the respective video accumulation servers performs the image format conversion processing in a distributed manner based on the processing sharing ratio calculated by the processing sharing ratio calculating unit 121. Thus, the image format conversion processing can be performed at high speed, and an integrated video can be generated at high speed.

Note that, in the case explained in this embodiment, the integration server 100 and the video accumulation servers $200_1$ to $200_m$ are connected by the dedicated network 30, and the integration server 100 and the video request terminal 10 are connected by the Internet 20. However, the invention is not limited to this and can be applied in the same manner in the case of other network structures in which, for example, a part of video accumulation servers are connected to the integration server 100 through other networks.

According to the invention, the multimedia-data integration apparatus is constituted so as to calculate a processing sharing ratio at which the respective multimedia-data accumulation apparatuses and the multimedia-data integration apparatus share conversion processing for converting multimedia data, which is used for creating integrated multimedia data, among the multimedia data accumulated in the multimedia-data accumulation apparatuses into the different data format, send the calculated processing sharing ratio calculated to the respective multimedia-data accumulation apparatuses, receive the multimedia data that is partially subjected to conversion processing by the respective multimedia-data accumulation apparatuses based on the sent processing sharing ratio, apply the conversion processing for a data format to multimedia data, which are not subjected to the conversion processing, among the received multimedia data, and integrate the multimedia data, which are subjected to the conversion processing by the respective multimedia-data accumulation apparatuses, and the multimedia data, which are subjected to the conversion processing, among the received multimedia data to create the integrated multimedia data. Thus, the processing for creating integrated multimedia data can be distributed appropriately.

According to the invention, since the processing for creating integrated multimedia data can be distributed appropriately, there is an advantage that processing time can be reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A multimedia-data integration apparatus comprising:
   a memory; and
   a computer processor reading the memory and executing
      a calculating unit that calculates a processing sharing ratio, by using a conjugate gradient method, with which the multimedia-data integration apparatus together with a first multimedia-data accumulation apparatus and a second multimedia-data accumulation apparatus both connected to the multimedia-data integration apparatus via a network share a conversion processing for converting a data format of first multimedia data including second multimedia data accumulated in the first multimedia-data accumulation apparatus and third multimedia data accumulated in the second multimedia-data accumulation apparatus into a different data format;
      a sending unit that sends the processing sharing ratio to each of the first and second multimedia-data accumulation apparatuses;
      a receiving unit that receives
         from the first multimedia-data accumulation apparatus, first voice data and first image data both separated from the second multimedia data, the first image data including first data that has not been subjected to conversion processing and second data that has been subjected to conversion processing by the first multimedia-data accumulation apparatus based on the processing sharing ratio, the first voice data having been subjected to conversion processing by the first multimedia-data accumulation apparatus, and
         from the second multimedia-data accumulation apparatus, second voice data and second image data both separated from the third multimedia data, the second image data including third data that has not been subjected to conversion processing and fourth data that has been subjected to conversion processing by the second multimedia-data accumulation apparatus based on the processing sharing ratio, the second voice data having been subjected to conversion processing by the second multimedia-data accumulation apparatus;
      a conversion processing unit that applies the conversion processing for a data format of the first and third data received by the receiving unit; and
      an integrating unit that integrates the converted first data, the received second data, the converted third data, and the received fourth data, and the received first and second voice data to create integrated multimedia data.

2. The multimedia-data integration apparatus according to claim 1, wherein the calculating unit calculates the processing sharing ratio based on calculation capabilities of the multimedia-data integration apparatus and each of the multimedia-data accumulation apparatuses in such a manner that time required for creation of the integrated multimedia data is minimized.

3. The multimedia-data integration apparatus according to claim 2, wherein the calculating unit calculates the processing sharing ratio based on a bandwidth of the network and the data formats accumulated in each of the multimedia-data accumulation apparatuses in addition to the calculation capabilities.

4. The multimedia-data integration apparatus according to claim 2, further comprising an acquiring unit that acquires calculation capabilities from each of the multimedia-data accumulation apparatuses, wherein
the calculating unit calculates the processing sharing ratio using the calculation capabilities acquired by the acquiring unit.

5. The multimedia-data integration apparatus according to claim 1, wherein the calculating unit calculates a ratio of the conversion processing performed in each of the multimedia-data accumulation apparatuses and the conversion processing performed in the multimedia-data integration apparatus for the conversion processing for a data format of the first and second image data as the processing sharing ratio.

6. The multimedia-data integration apparatus according to claim 1, wherein
   at least one of the second multimedia data and the third multimedia data is video data, and
   the calculating unit calculates a ratio of playing time of a video subjected to the conversion processing in each of the multimedia-data accumulation apparatuses and playing time of a video subjected to the conversion processing in the multimedia-data integration apparatus as the processing sharing ratio.

7. The multimedia-data integration apparatus according to claim 1, wherein
   the receiving unit receives a flag for identifying data of the second and/or third multimedia data subjected to the conversion processing by the multimedia-data accumulation apparatus, and
   the processing unit performs the conversion processing for a data format of the multimedia data based on the flag received by the receiving unit.

8. A multimedia-data integration method comprising:
   calculating a processing sharing ratio, by using a conjugate gradient method;
   sharing, by a multimedia-data integration apparatus together with a first multimedia-data accumulation apparatus and a second multimedia-data accumulation apparatus both connected to the multimedia-data integration apparatus via a network, a conversion processing converting a data format of first multimedia data including second multimedia data accumulated in the first multimedia-data accumulation apparatus and third multimedia data accumulated in the second multimedia-data accumulation apparatus into a different data format;
   sending the processing sharing ratio to each of the first and second multimedia-data accumulation apparatuses;
   receiving from the first multimedia-data accumulation apparatus, first voice data and first image data both separated from the second multimedia data, the first image data including first data that has not been subjected to conversion processing and second data that has been subjected to conversion processing by the first multimedia-data accumulation apparatus based on the processing sharing ratio, the first voice data having been subjected to conversion processing by the first multimedia-data accumulation apparatus,
   receiving from the second multimedia-data accumulation apparatus, second voice data and second image data both separated from the third multimedia data, the second image data including third data that has not been subjected to conversion processing and fourth data that has been subjected to conversion processing by the second multimedia-data accumulation apparatus based on the processing sharing ratio, the second voice data having been subjected to conversion processing by the second multimedia-data accumulation apparatus;

applying the conversion processing for a data format of the received first and third data to create converted data; and integrating the converted first data, second data, converted third data, and fourth data, and the first and second voice data to create integrated multimedia data.

9. A computer-readable storage recording medium encoded with a computer program for realizing a multimedia-data integration method on a computer when the computer program is executed, the multimedia-data integration method comprising:

calculating a processing sharing ratio, by using a conjugate gradient method;

sharing, by a multimedia-data integration apparatus together with a first multimedia-data accumulation apparatus and a second multimedia-data accumulation apparatus both connected to the multimedia-data integration apparatus via a network, a conversion processing converting a data format of first multimedia data including second multimedia data accumulated in the first multimedia-data accumulation apparatus and third multimedia data accumulated in the second multimedia-data accumulation apparatus into a different data format;

sending the processing sharing ratio to each of the first and second multimedia-data accumulation apparatuses;

receiving from the first multimedia-data accumulation apparatus, first voice data and first image data both separated from the second multimedia data, the first image data including first data that has not been subjected to conversion processing and second data that has been subjected to conversion processing by the first multimedia-data accumulation apparatus based on the processing sharing ratio, the first voice data having been subjected to conversion processing by the first multimedia-data accumulation apparatus, receiving from the second multimedia-data accumulation apparatus, second voice data and second image data both separated from the third multimedia data, the second image data including third data that has not been subjected to conversion processing and fourth data that has been subjected to conversion processing by the second multimedia-data accumulation apparatus based on the processing sharing ratio, the second voice data having been subjected to conversion processing by the second multimedia-data accumulation apparatus;

applying the conversion processing for a data format of the received first and third data to created converted data;

integrating the converted first data, the received second data, the converted third data, and the received fourth data, and the received first and second voice data to create integrated multimedia data; and transmitting the integrated multimedia data.

10. At least one computer-readable storage medium encoded with a computer program that when executed performs operations comprising:

calculating a ratio of conversion processing, by using a conjugate gradient method;

sharing, by a data integration apparatus together with a first multimedia-data accumulation apparatus and a second multimedia-data accumulation apparatus both connected to the multimedia-data integration apparatus via a network, the conversion processing that converts a first data format into a second data format including second multimedia data accumulated in the first multimedia-data accumulation apparatus and third multimedia data;

sending the ratio of conversion processing to each of the first and second data accumulation apparatuses;

receiving from the first multimedia-data accumulation apparatus, first voice data and first image data both separated from the first data, the first image data including first data that has not been subjected to conversion processing and second data that has been subjected to the conversion processing by the first data accumulation apparatus based on the ratio, the first voice data having been subjected to conversion processing by the first multimedia-data accumulation apparatus, receiving from the second multimedia-data accumulation apparatus, second voice data and second image data both separated from the third multimedia data, the second image data including third data that has not been subjected to conversion processing and fourth data that has been subjected to conversion processing by the second multimedia-data accumulation apparatus based on the processing sharing ratio, the second voice data having been subjected to conversion processing by the second multimedia-data accumulation apparatus;

applying the conversion processing to the received first and third data, to create converted data; and integrating the converted first data, the received second data, the converted third data, and the received fourth data, and the received first and second voice data to create integrated data.

11. At least one computer-readable storage medium as recited in claim 10, further comprising providing the integrated data for transmission to a user device where the integrated data is output.

* * * * *